US006993042B1

(12) United States Patent
Akatsuka et al.

(10) Patent No.: US 6,993,042 B1
(45) Date of Patent: Jan. 31, 2006

(54) LAN INTERFACE APPARATUS AND A METHOD OF CONTROLLING THE TRANSMISSION AND RECEPTION OF A FRAME

(75) Inventors: Takahiro Akatsuka, Fukuoka (JP); Hiroshi Kinoshita, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 659 days.

(21) Appl. No.: 09/723,406

(22) Filed: Nov. 28, 2000

(30) Foreign Application Priority Data

Dec. 28, 1999  (JP)  ............................... 11-372840

(51) Int. Cl.
*H04L 12/413* (2006.01)
(52) U.S. Cl. ........................................ 370/447; 370/230
(58) Field of Classification Search ................ 370/445, 370/447, 442, 443, 461, 466
See application file for complete search history.

(56) References Cited

U.S. PATENT DOCUMENTS

| 4,774,707 | A | * | 9/1988 | Raychaudhuri | ............. | 370/447 |
|---|---|---|---|---|---|---|
| 4,907,224 | A | * | 3/1990 | Scoles et al. | ................ | 370/443 |
| 5,081,622 | A | * | 1/1992 | Nassehi et al. | ............. | 370/440 |
| 5,210,750 | A | * | 5/1993 | Nassehi et al. | ............. | 370/440 |
| 5,276,682 | A | * | 1/1994 | Van As et al. | .............. | 370/443 |
| 5,761,430 | A | * | 6/1998 | Gross et al. | ................ | 709/225 |
| 5,892,769 | A | * | 4/1999 | Lee | ............................. | 370/447 |
| 5,960,000 | A | * | 9/1999 | Ruszczyk et al. | ........... | 370/447 |
| 6,381,228 | B1 | * | 4/2002 | Prieto et al. | ................ | 370/323 |
| 6,445,701 | B1 | * | 9/2002 | Bahl | .......................... | 370/368 |

FOREIGN PATENT DOCUMENTS

| JP | 4-352051 | 12/1992 |
|---|---|---|
| WO | WO 9115069 A1 * | 10/1991 |
| WO | WO 9739556 A1 * | 10/1997 |

OTHER PUBLICATIONS

Lai, Jian-Jou et al. "A Medium Access Control Protocol for Wireless Networks". IEEE International Conference on Communications, ICC 98. Jun. 7-11, 1998. vol. 1, pp. 146-150.*

Yoon, C.J. et al. "Efficient Net Access Scheduler in MIL-STD-188-220A". Military Communications Conference, MILCOM 98. O 18-21, 1998. vol. 1, pp. 253-257.*

* cited by examiner

*Primary Examiner*—John Pezzlo
*Assistant Examiner*—Donald L Mills
(74) *Attorney, Agent, or Firm*—Katten Muchin Rosenman LLP

(57) ABSTRACT

Disclosed is a method of avoiding a collision of a frame and enabling the guarantee of the QoS in a network using the CSMA/CD system, wherein when a terminal transmits a frame onto a transmission line, timing information as to the timing of transmitting a next frame is added to the frame. All the terminals in the same segment reserve the timing information in timing reservation management tables respectively, as the timing of transmitting a frame from other terminal, and prohibit the transmission of frames from their own terminals. In addition to that, each terminal reserves the timing of transmitting a next frame from its own terminal in a timing reservation management table, and when the timing comes, it transmits a next frame onto the transmission line.

12 Claims, 30 Drawing Sheets

FIG. 9A

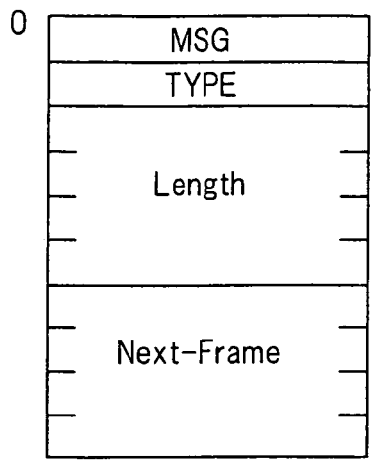

MSG: MESSAGE TYPE
  01: REQUEST FOR FRAME TRANSMISSION
TYPE: FRAME TYPE
  01: PREFERENTIAL FRAME (LEADING)
  02: PREFERENTIAL FRAME (NON-LEADING)
  03: GENERAL FRAME

Length: TRANSMISSION FRAME SIZE

Next-Frame: NEXT FRAME TRANSMITTING TIMING
  (msec)

FIG. 9B

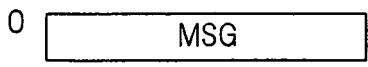

MSG: MESSAGE TYPE
  OF: REQUEST FOR CARRIER

FIG. 9C

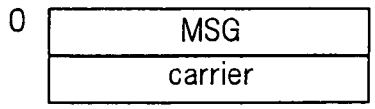

MSG: MESSAGE TYPE
  10: NOTICE OF CARRIER
carrier:  01  CARRIER
          02  NO CARRIER

FIG. 9D

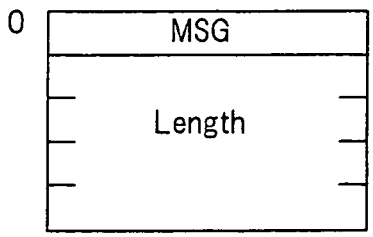

MSG: MESSAGE TYPE
  02: TRANSMISSIBLE

Length: TRANSMISSIBLE FRAME SIZE

FIG. 9E

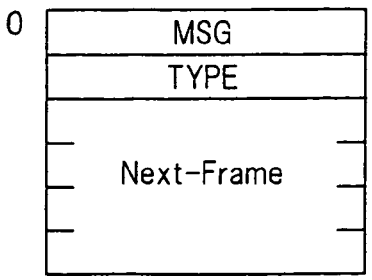

MSG: MESSAGE TYPE
  03: TRANSMITTING TIMING
TYPE: FRAME TYPE
  01: PREFERENTIAL FRAME (LEADING)
  02: PREFERENTIAL FRAME (NON-LEADING)
  03: GENERAL FRAME
Next-Frame: NEXT FRAME TRANSMITTING TIMING
  (msec)

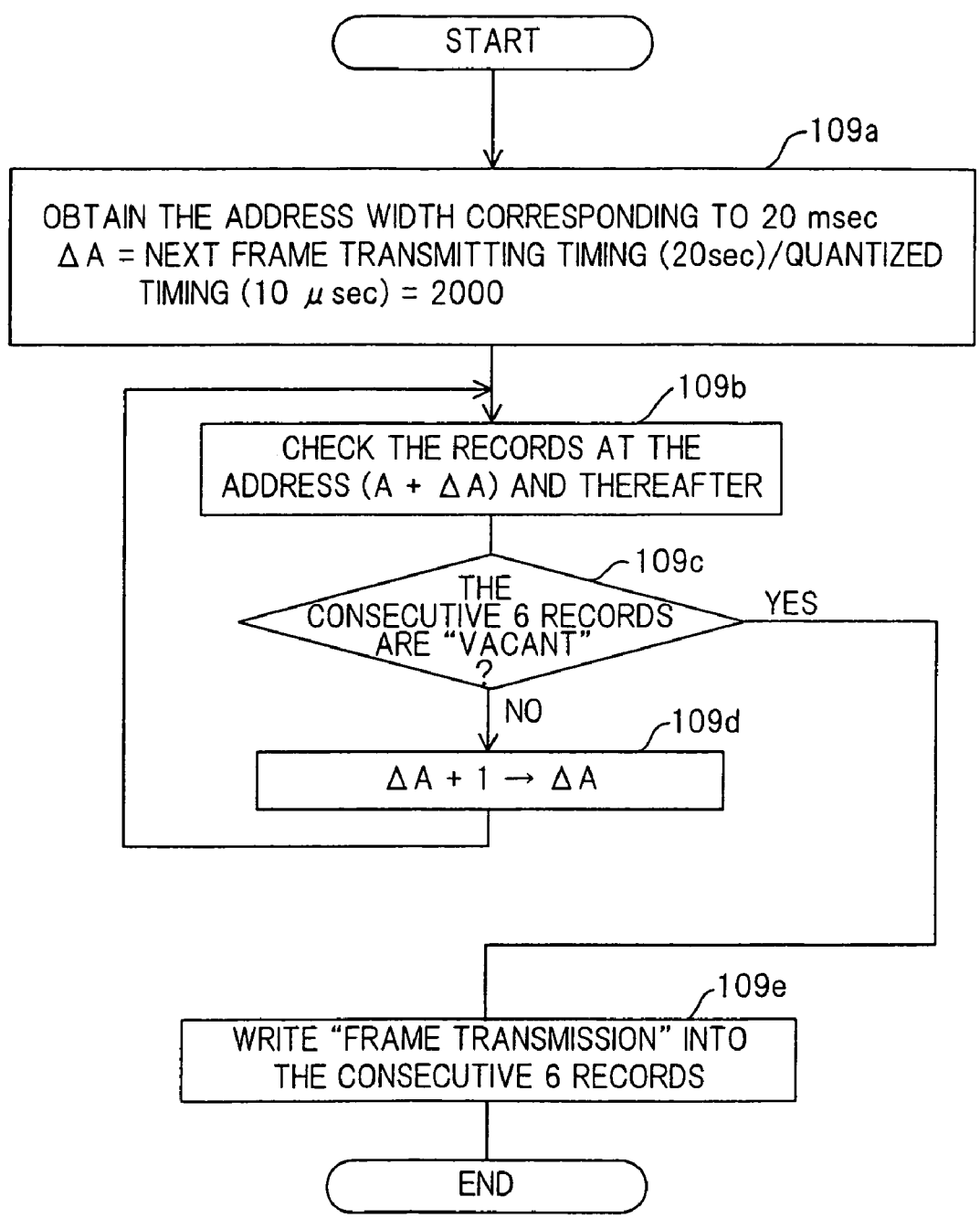

FIG. 14A

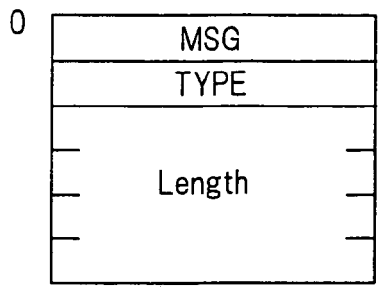

MSG: MESSAGE TYPE
   04: FRAME ASSEMBLY
TYPE: FRAME TYPE
   01: PREFERENTIAL FRAME (LEADING)
   02: PREFERENTIAL FRAME (NON-LEADING)
   03: GENERAL FRAME

Length: SIZE OF FRAME TO BE TRANSMITTED

FIG. 14B

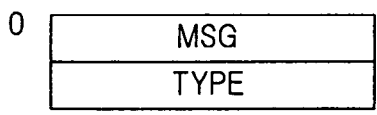

MSG: MESSAGE TYPE
   05: END OF FRAME ASSEMBLY
TYPE: FRAME TYPE
   01: PREFERENTIAL FRAME (LEADING)
   02: PREFERENTIAL FRAME (NON-LEADING)
   03: GENERAL FRAME

FIG. 14C

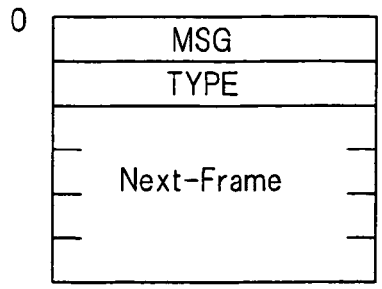

MSG: MESSAGE TYPE
   06: REQUEST FOR THE TRANSMISSION OF FRAME
TYPE: FRAME TYPE
   01: PREFERENTIAL FRAME (LEADING)
   02: PREFERENTIAL FRAME (NON-LEADING)
   03: GENERAL FRAME

Next-Frame: NEXT FRAME TRANMITTING TIMING

MSG: MESSAGE TYPE
    0B: REPORT THE RESULT OF FRAME TRANSMISSION
Status: TRANSMISSION STATUS
    01: NORMAL TRANSMISSION IS FINISHED
    02: A COLLISION IS DETECTED MSG: MESSAGE TYPE
    0A: REQUEST FOR CANCELLATION OF TRANSMITTING TIMING
Next-Frame: NEXT FRAME TRANMITTING TIMING

MSG: MESSAGE TYPE
    0C: REQUEST FOR RETRANSMISSION OF FRAME

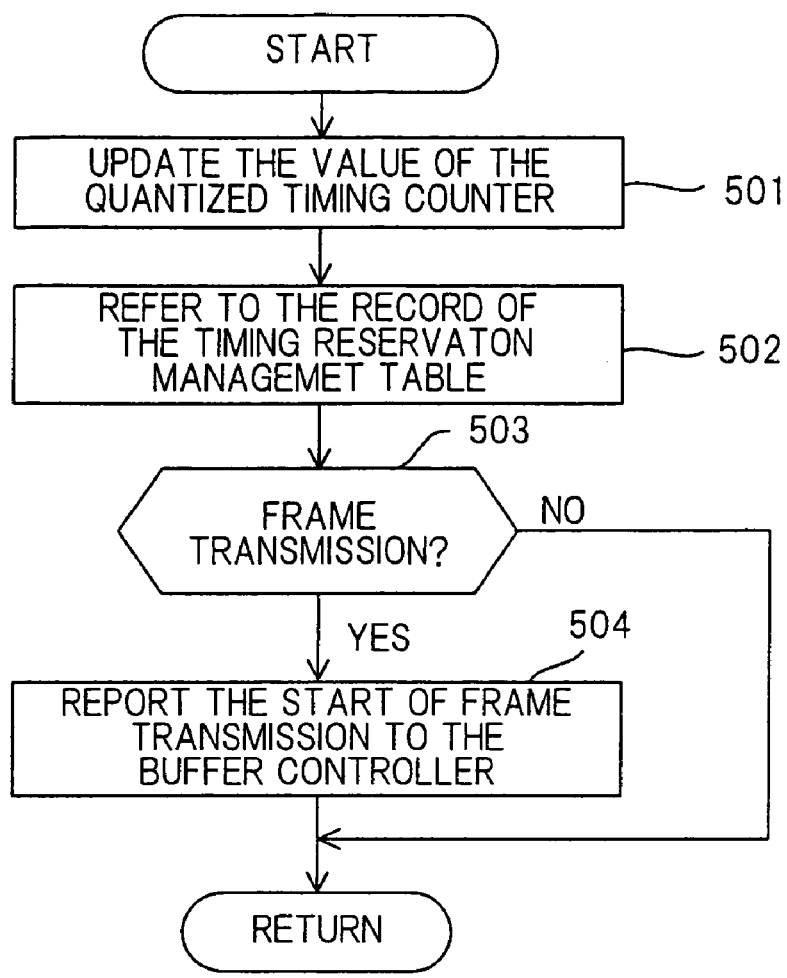

MSG: MESSAGE TYPE
  07: RECEIVE FRAME

MSG: MESSAGE TYPE
  08: RECEIVE TIMING

Next-Frame: NEXT FRAME RECEIVING TIMING

MSG: MESSAGE TYPE
  09: REQEUST FOR FRAME DISASSEMBLY

MSG: MESSAGE TYPE
     OE: REPORT OF TRANSMISSION SPEED

Speed: 01  10Mbps
       02  100Mbps
       03  1000Mbps

LAN INTERFACE APPARATUS AND A METHOD OF CONTROLLING THE TRANSMISSION AND RECEPTION OF A FRAME

BACKGROUND OF THE INVENTION

The present invention relates to a network interface apparatus and a method of controlling the transmission and reception of a frame and, more particularly, to an interface apparatus and a method of controlling the transmission and reception of a frame in a network which utilizes a CSMA/CD (Carriers Sense Multiple Access with Collision Detection) system.

Recently, LANs have increasingly been introduced into offices and homes, and the flow of the frames which are required to have a real-time nature on the LAN through an internet or an intranet such as moving pictures and sound has been rapidly increasing with the spread of internets/intranets. Under the CSMA/CD system, however, if the flow of the frames increases, a collision on a transmission medium is of frequent occurrence, which leads to long transmission delays, so that it is impossible to secure a real-time nature which frames are required to have, and as a result, it is impossible to ensure the QoS (Quality of Service) thereof. Therefore, the guarantee of the QoS as to the real-time nature is now demanded in the CSMA/CD system.

At present, attempts to control the QoS by reserving resources by using a protocol such as RSVP (Resource Reservation Protocol) and diff serve are continued as to an upper layer such as an IP (Internet Protocol) layer. In the present situation, however, the strict QoS control is not realized in a LAN as a lower layer, which uses the widespread CSMA/CD system.

FIG. 34 are explanatory views of the principle of the CSMA/CD system in a LAN. In the drawings, a horizontal line L indicates a shared transmission line such as a bus consisting of a coaxial cable. To short branches of the bus are connected stations such as terminals and a host. When a terminal A has data to be transmitted, it confirms whether signals (carriers) are flowing on the bus L or not, and if there are no signals, it transmits a frame $F_A$. At this time, there is a possibility of another terminal B transmitting a frame $F_B$ approximately at the same time, more strictly, before the frame $F_A$ which the terminal A transmits does not reach the terminal B. In such a case, the frame $F_A$ which has been transmitted from the terminal A and the frame $F_B$ which has been transmitted from the terminal B collide with each other somewhere between A and B, so that the data of both frames are destroyed.

In the CSMA/CD system, it is necessary to monitor whether such a collision has occurred or not, and to retransmit a frame if there is a collision. For this purpose, the terminals A and B which have transmitted the frames do not stop monitoring whether a collision occurs or not during the transmission. Since the signal transmitted from the terminal A propagates on both ways along the bus L, it reaches the terminal B after a certain time. At this point of time, the terminal B, which has started transmission, detects a collision. The terminal B then sends a random signal which is called a jam signal for reporting the occurrence of the collision to other terminal for some consecutive time. Some time after the detection of the collision by the terminal B, the frame transmitted from the terminal B reaches the terminal A, which also detects a collision and sends a jam signal. After jam signals are sent for a certain time, both the terminals A and B keep silent. This silent time is called a back-off time. After the back-off time is elapsed, the terminals A and B confirm that the transmission line is idle, and then restarts the transmission operation.

If the back-off times of all the terminals are the same, since the terminals A and B restart the transmission operation approximately at the same time, so that a collision occurs again. To prevent this, the CSMA/CD system adopts a back-off algorithm to prevent the repetition of a collision and to give an equal chance of transmitting a frame to each terminal. Owing to this algorithm, there is a large difference in the back-off time between the terminals A and B, so that there is a high probability of one keeping silent even if the other starts retransmission, and the chance for a second collision is scarce.

In the CSMA/CD system, the minimum frame length is prescribed in order to detect a collision. It is here assumed that the time necessary for the frame which the terminal A' on the left-most end of the bus has transmitted to reach the destination terminal B' on the right-most end of the bus is Tm. If the terminal B' starts the transmission of a frame just Tm after the terminal A' has started transmission, the frame of the terminal B' immediately collides. A slight time Tc elapses until the terminal B' detects the collision. Then the terminal B' sends a jam signal, which reaches the terminal A' after Tm. Accordingly, the terminal A' does not perceive the collision and may mistakenly judge that the frame has safely reached the destination, if the terminal A' does not continue to transmit the frame for the time 2Tm+Tc. The frame length corresponding to this time 2Tm+Tc is the minimum frame length, and it is possible to detect a collision during the transmission of a frame irrespective of the positions of the terminals A' and B'. Every terminal is prohibited from transmitting a frame having a frame length shorter than this. In transmitting information having a shorter frame length, meaningless information called 'pad' is sent idly so as to lengthen the frame length to the length corresponding to 2Tm+Tc. In this manner, if collision detection is carried out during the transmission of a frame, it is possible to detect any collision.

Since a LAN of the above-described CSMA/CD system adopts a first-come-first-served system, when any terminal A which is connected in the same segment, as shown in FIG. 35, is in the process of transmission of a frame, other terminal C cannot start transmission until the transmission by the terminal A is finished. That is, even if the terminal C wants to transmit a frame having a real-time-nature, the transmission is impossible until the terminal A has finished transmission. In addition, if a plurality of terminals start transmission at the same time, a collision occurs, so that a back-off processing is carried out and a strict QoS is not realized.

A method of controlling the reservation for the timing of transmitting a frame for the purpose of reducing the frequency of collisions when the load is high is proposed (Japanese Patent Laid-Open No. 46263/1995). According to this method, when communication is established between the terminals A and B, as shown in FIG. 36, (a) the time is adjusted to coincide between the terminals A, B, and the terminal A produces a time chart (FIG. 37) for making the reservation at intervals and alternately, transmits the time chart to the terminal B and negotiates with the terminal B so that the terminal B holds the time chart, (b) and the terminals A and B thereafter transmit frames in accordance with the time chart.

The CSMA/CD system suffers from a fundamental problem of the occurrence of a collision because it is impossible to know when each terminal starts the transmission of a frame. In the prior art aimed at the solution of this problem, it is necessary for each terminal to determine and hold a common time chart by previous negotiation, and the time chart once determined is never updated. For this reason, the terminal C which is not set in the time chart cannot wedge itself into the queue so as to transmit a frame. In addition, although there is sometimes a case in which data to be transmitted are not produced from the upper layer (IP layer) as the time chart prescribes, no consideration is given to such a case in the prior art.

SUMMARY OF THE INVENTION

Accordingly, it is an object of the present invention to eliminate the above-described problems in the related art, and to prevent a collision of frames and to guarantee the QoS in a LAN of the CSMA/CD system.

It is another object of the present invention to enable the terminals in the same segment (on the shared transmission line) to know a next frame transmitting timing of each other, thereby preventing a collision of frames.

It is still another object of the present invention to guarantee the QoS of not only a fixed-rate frame but also a flexible-rate frame such as a moving picture of which the real-time nature is required.

It is a further object of the present invention to realize the guarantee of the QoS by preventing a collision of frames irrespective of the type of Ethernet.

To achieve the above-described objects, in a first aspect of the present invention, there is provided a method of controlling the transmission and reception of a frame in a network which uses the CSMA/CD system, comprising the steps of (1) adding timing information as to the timing of transmitting a next frame from each terminal to a frame when the frame is transmitted from the each terminal onto a shared transmission line, (2) estimating the timing of receiving a frame from other terminals on the basis of the timing information by said each terminal which is connected to the shared transmission line, (3) reserving the estimated timings of receiving a frame by the respective terminals, and (4) prohibiting the terminals from transmitting frames at the respective reserved timings.

In a second aspect of the present invention, there is provided a method of controlling the transmission and reception of a frame, comprising the steps of (5) dividing data to be transmitted into a former half which has a prescribed size and a latter half when the size of the data to be transmitted is larger than the prescribed size, (6) determining the timing of transmitting a latter frame which contains the latter half data on the basis of the time necessary for the transmission of a former frame containing the former half data, and (7) regarding the latter frame as a next frame and adding the timing information as to the timing of transmitting the next frame to the former frame containing the former half data.

In a third aspect of the present invention, there is provided a LAN interface apparatus in a LAN which uses the CSMA/CD system, comprising: (1) a transmitting timing information adding portion for adding timing information as to the timing of transmitting a next frame to a frame when the frame is transmitted onto a shared transmission line; (2) a timing extracting portion for extracting the next frame transmitting timing information from a frame which is transmitted onto the shared transmission line from other terminal, and using the extracted timing as the timing of receiving the frame from that terminal; (3) a timing reservation management table for reserving a timing of transmitting a next frame from its own terminal and a timing of receiving a frame from other terminal; and (4) a timing controller for prohibiting the own terminal from transmitting a frame at the timing of receiving a frame from other terminal and allowing the own terminal to transmit the frame onto the transmission line when the next frame transmitting timing comes by reference to the timing reservation management table.

In a fourth aspect of the present invention the LAN interface apparatus further comprises: (5) a timer which increments at certain intervals of time, (6) a table management portion for using the time measured by said timer as an address, and for recording 'frame transmission by other terminals', 'frame transmission by its own terminal' or 'vacant' at a storage position of the timing reservation management table indexed by the address, (7) a means for detecting the transmission speed of the transmission line, and (8) a means for determining the unit of the increment of the timer on the basis of the transmission speed.

Other features and advantages of the present invention will be apparent from the following description taken in conjunction with the accompanying drawings.

BRIEF DESCRIPTION OF THE DRAWINGS

FIGS. 9A to 9E are explanatory views of various types of messages;

FIG. 13 shows the reservation routine of a timing reservation management table;

FIGS. 14A to 14C show the formats of various types of messages;

FIG. 23 is a flowchart of a process carried out when a notice of start of transmission of a frame from the timing controller is received;

FIG. 24 is a format for notifying the start of transmission of a frame;

DESCRIPTION OF THE PREFERRED EMBODIMENTS (A) Schematic Explanation of the Invention FIG. 1 is an explanatory view of the principle of the present invention. In FIG. 1, the referential numerals 1 to 3 denote terminals in a LAN of the CSMA/CD system, 4 a shared transmission line, and 5 to 7 timing reservation management tables provided in the terminals 1 to 3, respectively. Each of the timing reservation management tables 5 to 7 uses the time measured by a timer as an address and records 'frame transmission by other terminal', 'frame transmission by its own terminal' or 'vacant' at a storage position indexed by the address.

When the terminal 1 transmits a frame FRM onto the transmission line 4, it adds timing information as to the timing of transmitting a next frame (referred to as 'next frame transmitting timing information' hereinafter) NFT to the frame FRM. All the other terminals 2, 3 in the same segment reserve the next frame transmitting timing information NFT which is added to the frame FRM as a timing Ar of transmitting a frame by other terminal in the timing reservation management tables 6, 7, and prohibit themselves from transmitting a frame at the reserved timing Ar. The terminal 1 also reserves a timing As of transmitting a next frame by its own terminal in the timing reservation management table 5, and transmits a next frame onto the transmission line 4 when the next frame transmitting timing As comes.

Similarly, when the terminal 2 transmits a frame FRM onto the transmission line 4, it adds next frame timing information NFT to the frame FRM. All the other terminals 1, 3 in the same segment reserve the next frame transmitting timing information NFT which is added to the frame FRM as a timing Br of transmitting a frame by other terminal in the timing reservation management tables 5, 7, respectively, and prohibit themselves from transmitting a frame at the reserved timing Br. The terminal 2 also reserves a next frame transmitting timing Bs of transmitting a next frame by its own terminal in the timing reservation management table 6, and transmits a next frame onto the transmission line 4 when the next frame reservation timing Bs comes.

Figure 1:
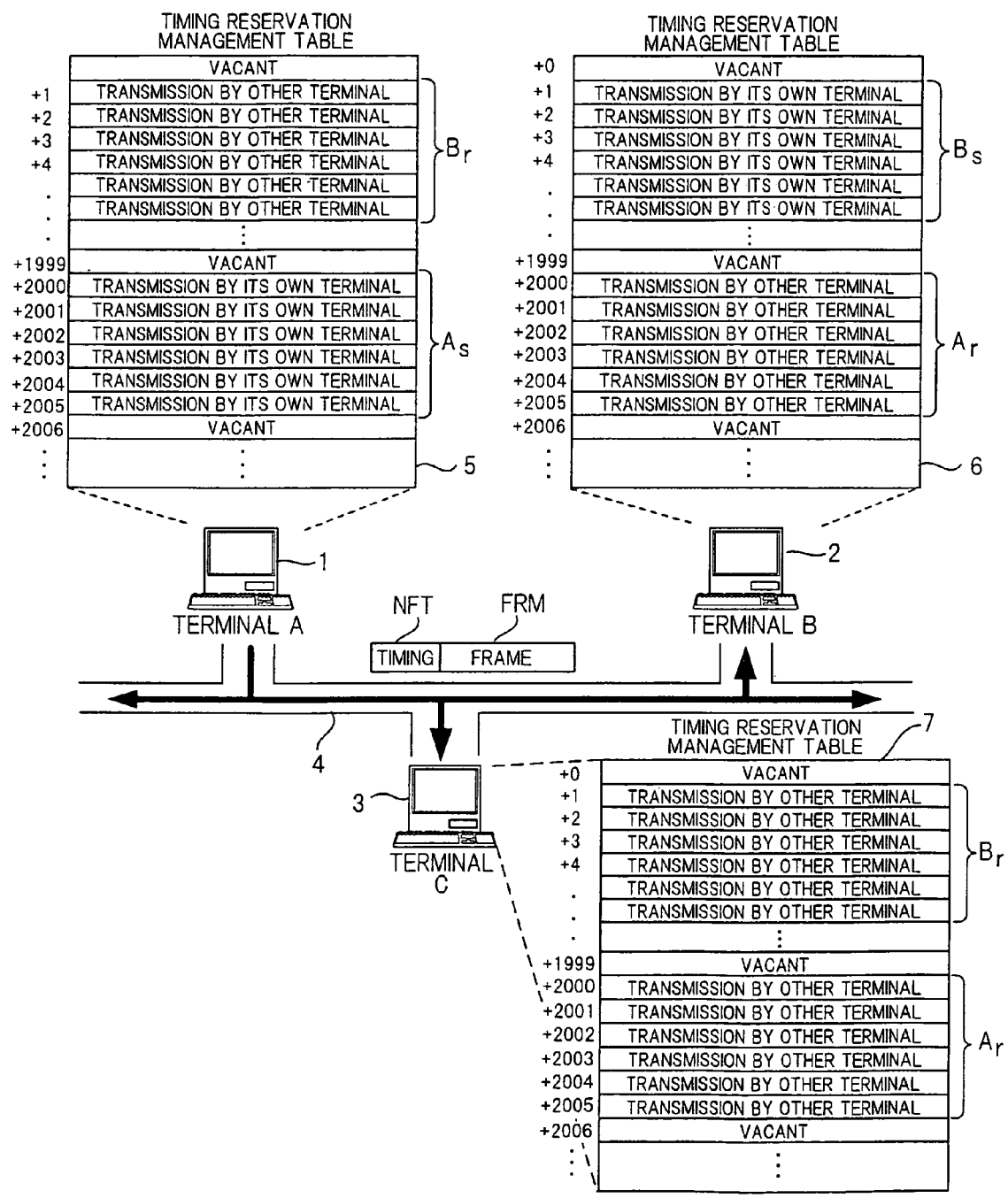
FIG. 1 is a schematic explanatory view of the present invention.

In FIG. 1, the reservation management table 5 of the terminal 1 reserves the next frame transmitting timing As for the terminal 1 and the timing Br of receiving a frame from the terminal 2. Similarly, the reservation management table 6 of the terminal 2 reserves the next frame transmitting timing Bs for the terminal 2 and the timing Ar of receiving a frame from the terminal 1. The reservation management table 7 of the terminal 3 reserves the timing Ar of receiving a frame from the terminal 1 and the timing Br of receiving a frame from the terminal 2.

In this manner, it is possible to know the timing of transmitting a next frame from other terminal in the segment, thereby enabling the prevention of a collision. That is, since it is possible to transmit a frame at the right time when other terminal is not transmitting a frame, a collision is prevented with certainty.

The next frame transmitting timing information NFT is added to the frame FRM by disposing the timing information NFT in the front portion of the preamble of the frame FRM to be transmitted, or by inserting the timing information NFT into a carrier extension which is added when the transmission data size is smaller than a prescribed size (for example, in the case of a Giga bit Ehternet LAN). By transmitting the frame FRM with the next frame transmitting timing information NFT added in the front portion of the preamble, the effect of prevention of a collision of frames will be expected without exerting any influence on the existent Ethernet. In the case of a Giga bit Ehternet LAN, the insertion of the next frame transmitting timing information NFT into the carrier extension excludes the influence on the frame, and enables the reservation of the next frame transmitting timing without reducing the transmission efficiency, thereby realizing the prevention of a collision of frames.

If the size of a packet which a terminal is instructed to transmit by the host apparatus is larger than a prescribed size, the LAN interface apparatus of the terminal divides the packet into a former packet which has the prescribed size and a latter packet, and stores the former and latter packets in a buffer in the form of a queue. The terminal also decides the next frame transmitting timing information NFT to be added to a frame which is composed of the former packet, on the basis of the time required for transmitting the former packet. If the latter packet is larger than the prescribed size, it is further divided into two portions and a similar process is repeated when it is transmitted in the form of a frame.

In a LAN of 10 Mbps, the maximum site of one frame is 1518 bytes. When the size of a received packet exceeds 1500 bytes (the length of a packet portion in the maximum frame length 1518 bytes which can be transmitted to a lower layer at one time), the packet cannot be transmitted at one time, so that it is divided. At this time, the next frame transmitting timing information NFT added to the former portion of the divided packet means the timing of transmitting the latter portion of the divided packet, and it is determined on the basis of the time required for transmitting the former packet.

In the above-described way, it is possible to prevent a collision of not only a fixed-rate frame but also a flexible-rate frame such as a moving picture which involves burst transmission and also requires the real-time nature, thereby enabling the guarantee of the QoS thereof.

Each of the timing reservation management tables 5 to 7 uses the time measured by a timer which increments at certain intervals of time as an address and records 'frame transmission by other terminal' or 'frame transmission' by its own terminal at a storage position indexed by the address, and 'vacant' at the other portions. In this manner, by providing each terminal with the timing reservation management table and timer for indexing the table by the time, it is possible to reserve a next frame transmitting timing. In this case, it is possible to realize the prevention of a collision irrespective of the type of Ethernet by changing the unit of increment of the timer in accordance with the type of Ethernet.

(B) The Portion to which the Present Invention is Applicable

Figure 2:
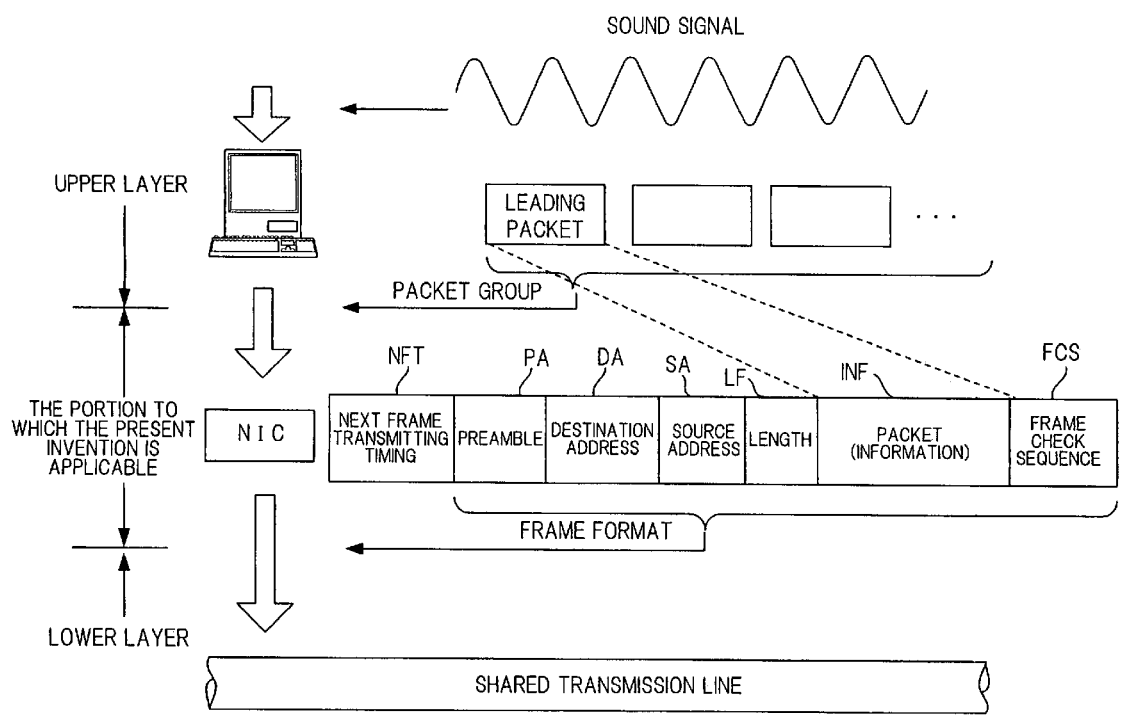
FIG. 2 is an explanatory view of a portion to which the present invention is applicable.

FIG. 2 is an explanatory view of the portion to which the present invention is applicable. In FIG. 2, a network interface card NIC according to the present invention is provided between an IP layer as an upper layer and a shared transmission line of a LAN as a lower layer. When a sound signal is transmitted to a terminal as a destination via the LAN and the IP network, the sound signal is converted into packets in the upper layer, a frame is formed from each packet by adding a header and a footer in the network interface card NIC and sent out onto the transmission line of the LAN, and each frame is transmitted to the terminal via the LAN and the IP network. Each frame is composed of a preamble PA for establishing synchronism, a destination address DA, a source address SA, the number LF of octets (length) of the succeeding information field, the information field INF, and a frame check sequence FCS. If information is too short for the minimum frame length, the information filed INF is filled with a pad. In the present invention, when the timing of transmitting a next frame is known, the next frame transmitting timing information NFT is added.

(C) Structure of Interface Apparatus

Figure 3:
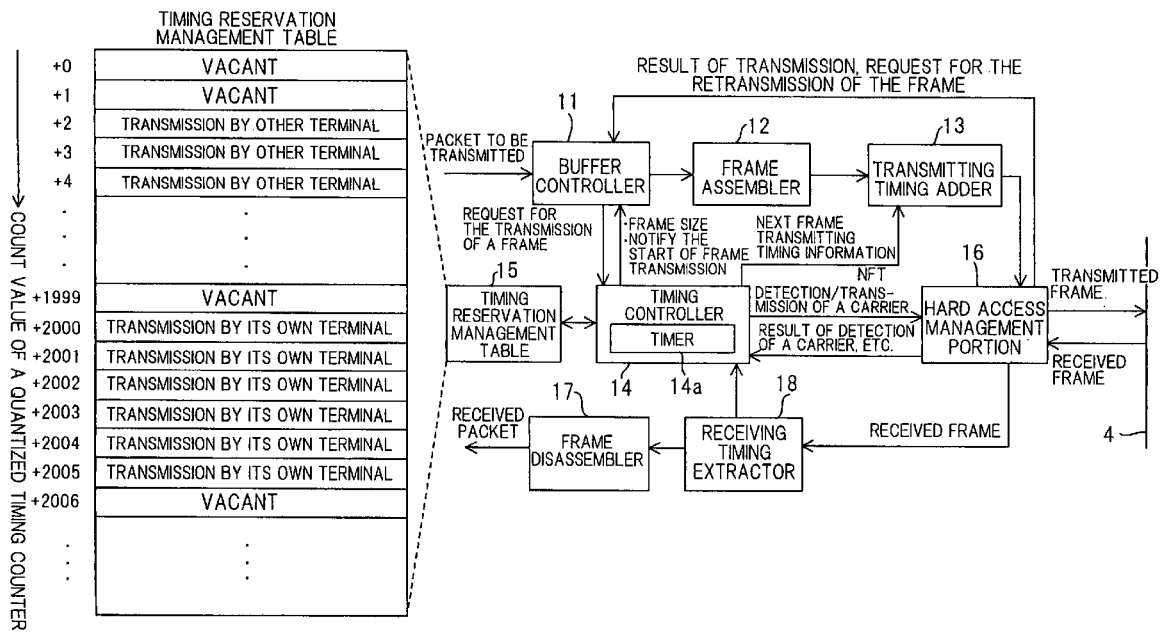
FIG. 3 shows the structure of a LAN interface apparatus according to the present invention.

FIG. 3 is a block diagram of the structure of the network interface card NIC (referred to as 'LAN interface apparatus' hereinafter) according to the present invention which executes interface control between an upper layer and Ethernet of the CSMA/CD system as a lower layer.

A buffer controller 11 queues the IP packets which are transmitted from the IP layer as the upper layer in a buffer (not shown), and sends a request for the transmission of a frame to a timing controller 14, when the buffer controller 11 receives an IP packet, or when the timing controller 14 instructs the buffer controller 11 to send the request. The request for the transmission of a frame contains whether the IP packet is a preferential packet or a general packet, whether the IP packet is a leading packet or not, a next frame transmitting timing, a frame size, etc. The buffer controller 11 also instructs a frame assembler 12 at the next stage to assemble a frame on the basis of the instruction of the timing controller 14.

Figure 4:
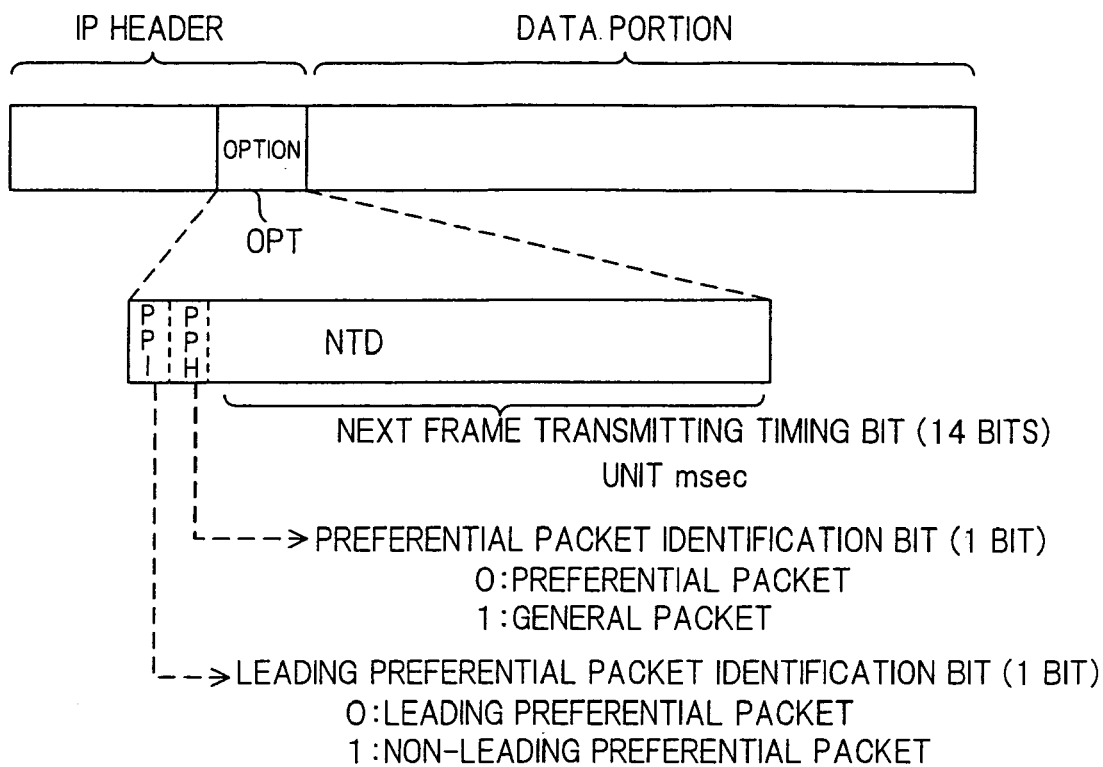
FIG. 4 shows the structure of an IP datagram (IP packet)

Each IP packet has a structure shown in FIG. 4. Whether the IP packet is a preferential packet or a general packet is judged by referring to an identification bit PPH which is contained in the option portion OPT of an IP header, whether the IP packet is a leading packet or not is judged by referring to a leading identification bit PPI, and the next frame transmitting timing is found by referring to a next frame transmitting timing bit NTD.

Figure 5:
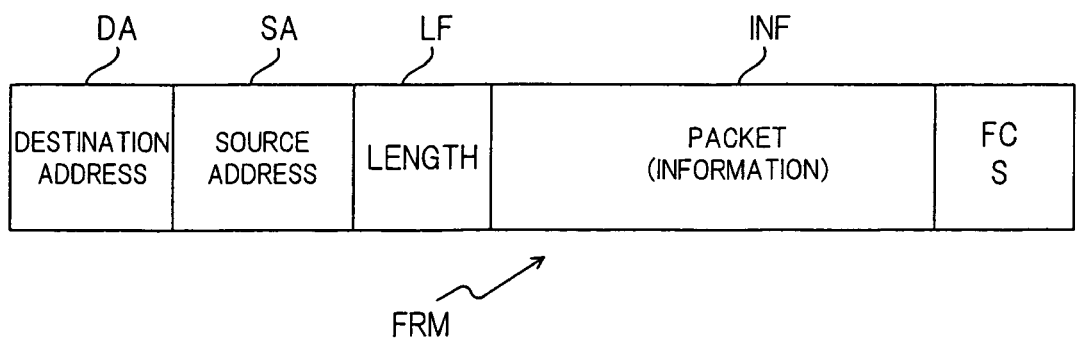
FIG. 5 shows the structure of a frame.

The frame assembler 12 produces a transmission frame FRM (see FIG. 5) by using the destination address DA, the source address SA, the length LF, and the packet (information field) INF which are provided by the upper layer and a frame check sequence FCS calculated from these data.

A transmitting timing adder 13 adds a preamble PA to the transmission frame FRM produced by the frame assembler 12, adds the next frame transmitting timing information NFT sent from the timing controller 14 to the front portion of the preamble PA or a carrier extension CEXT or the like, and sends the request for the transmission of a frame to a hard access management portion 16.

Figure 6A:
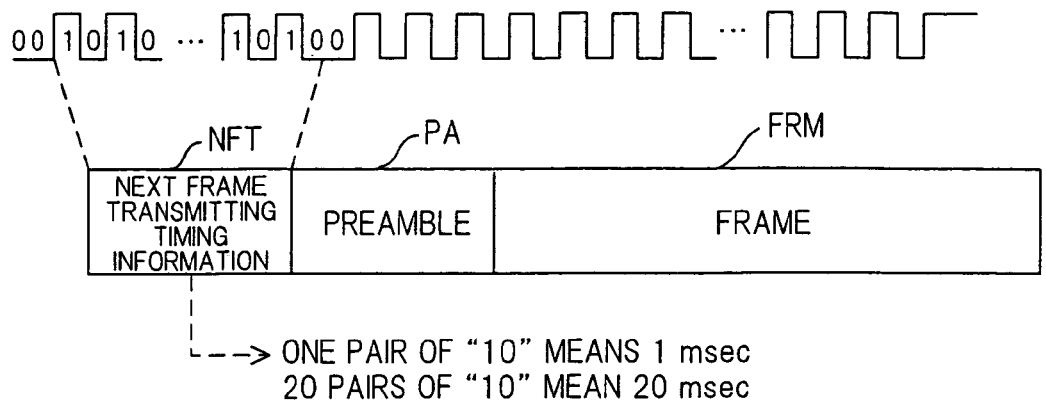
FIGS. 6A and 6B are explanatory views of a method of adding information as to the timing of transmitting a next frame.
Figure 6B:
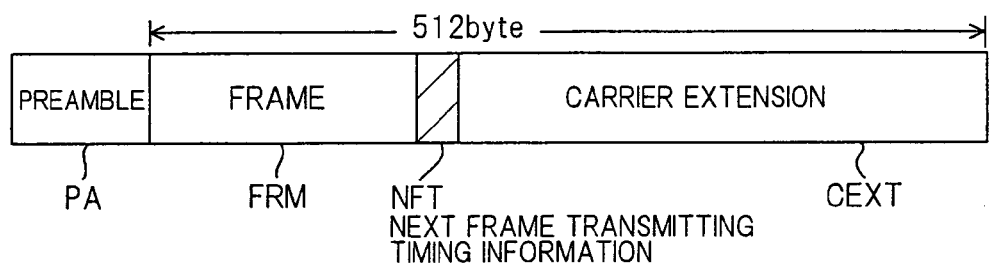

FIGS. 6A and 6B are explanatory views of a method of adding the next frame transmitting timing information NFT to a frame, wherein FIG. 6A shows an example of a method of adding the next frame transmitting timing information NFT to the front portion of the preamble PA, while FIG. 6B shows an example of a method of inserting the next frame transmitting timing information NFT into the carrier extension CEXT.

In FIG. 6A, the transmitting timing adder 13 encodes the next frame transmitting timing information NFT sent from the timing controller 14, synthesizes the encoded next frame transmitting timing information NFT with the front portion of the preamble PA, and thereafter sends the request for the transmission of a frame to the hard access management portion 16. The next frame transmitting timing information NFT is encoded by converting a unit of 1 msec into 2 bits '10'. For example, 20 msec is represented by 20 consecutive pairs of '10' (40 bits), and '00'and '0' are arranged before and after, respectively, the consecutive 40 bits of '10'. Thereafter, these bits are synthesized with the front portion of the preamble PA.

In FIG. 6B, the transmitting timing adder 13 adds the next frame transmitting timing information NFT by using the first 4 bytes of the carrier extension CEXT, and sends the request for the transmission of a frame to the hard access management portion 16. In the Giga bit Ethernet (transmission speed is 1 Gbps), the minimum frame length of a transmission frame is 512 bytes. When the frame length is short of the minimum frame length, the carrier extension CEXT is added. The first 4 bytes of the carrier extension CEXT are used as the next frame transmitting timing information NFT at the time of transmission. It is general that when sound data are transmitted in an internet, they are converted into packets. Each packet has 64 bytes, and the packets are transmitted one by one at an interval of 20 msec. Accordingly, the length of the carrier extension CEXT is 512−64=448 bytes, and the first 4 bytes are used for transmitting the next frame transmitting timing information NFT. Since 4 bytes are necessary as the next frame transmitting timing information NFT, if the frame length of a transmission frame is shorter than 508 bytes, the carrier extension CEXT is added, and the first 4 bytes are used for transmitting the next frame transmitting timing information NFT.

Returning to FIG. 3, the timing controller 14 has the following functions. (1) It controls the timing reservation management table 15 and reserves/deletes the timing of transmitting a next frame and the timing of receiving a next frame from other terminal. (2) It receives the request for the transmission of a frame from the buffer controller 11, and if the transmission of the frame is possible from the point of timing, it sends a request for the transmission/detection of a carrier signal to the hard access management portion 16. (3) If the transmission of the frame is possible from the point of timing, and if no carrier transmitted from other terminal is detected on the transmission line 4, the timing controller 14 instructs the buffer controller 11 to send a frame and at the same time transfers the next frame transmitting timing information NFT to the transmitting timing adder 13. (4) The timing controller 14 refers to the timing reservation management table 15, and when the timing of transmitting a next frame comes, it instructs the buffer controller 11 to send a request for the transmission of a next frame which is queued in the buffer, and controls the timing of transmitting a frame.

The timing reservation management table 15 uses the time (quantized timing) measured by a timer 14a provided in the timing controller 14 as an address, and records 'a timing of receiving a frame from other terminal (referred to as 'frame transmission by other terminal', hereinafter)', 'a timing for transmitting a frame from its own terminal (referred to as 'frame transmission by its own terminal', hereinafter)' or 'an unreserved timing (vacant)' at a storage position indexed by the address. The quantized timing is based on the time required for transmitting a frame of 64 bytes (512 bits). In the case of an Ethernet having a transmission speed of 10 Mbps, since 60 $\mu$sec is necessary for transmitting 600 bits (>512 bits), one quantized timing is set at 10 $\mu$sec and 'frame transmission' by its own terminal or 'frame transmission by other terminal' is written into 6 consecutive addresses for the purpose of reservation. Incidentally, if the quantized timing is too rough, the efficiency of using the transmission line is lowered, while if it is too fine, the table size becomes inconveniently large.

The hard access management portion 16 serves as an interface portion for the lower layer (LAN), and executes the transmission/reception of a frame to/from the LAN, the detection of the transmission speed, the transmission/detection of a carrier, and the detection of a collision. When the hard access management portion 16 is required to transmit a carrier by the timing controller 14, the hard access management portion 16 checks whether a carrier is transmitted onto the transmission line 4 from other terminal, and reports the result of detection to the timing controller 14. If no carrier is detected, the hard access management portion 16 transmits a carrier. When the hard access management portion 16 detects a collision during the transmission of a frame, it suspends the processing so as to notify the collision to the buffer controller 11. In a case where a preferential frame is transmitted, it also notifies the timing controller 14 of a request for the cancellation of the transmitting timing. When a back-off time is elapsed thereafter, the hard access management portion 16 notifies the buffer controller 11 of a request for the retransmission of the frame.

A frame disassembler 17 disassembles a received frame into the destination address, the source address, the length, the packet, and the frame check sequence, and if the destination address is its own terminal, it reports that to the upper layer.

A receiving timing extractor 18 extracts the next frame transmitting timing information NFT which is added to the preamble PA or the carrier extension CEXT from a received frame, and notifies the timing controller 14 of the timing information NFT, and at the same time eliminates it from the frame and transmits it to the frame disassembler 17.

(D) Operation as a Whole (a) Fundamental Operation at the Time of Transmitting a Frame The fundamental operation at the time of transmitting a preferential packet which has been sent from the upper layer, to the lower layer will be explained. When the buffer controller 11 in a LAN interface apparatus receives a packet from the upper layer, it queues the received packet in the buffer, and judges whether the packet is a preferential packet or not, and whether the packet is a leading packet of a series of a packet group which is produced during one communication or not, and also recognizes a timing of transmission for a next packet, etc. If it is a leading and preferential packet, the buffer controller 11 transmits a message requesting the transmission of a frame to the timing controller 14. The timing controller 14 refers to the received message requesting the transmission of a frame, and if the packet to be transmitted is the head packet of the preferential packet group, the timing controller 14 reserves a next frame transmitting timing in the timing reservation management table 15, and at the same time instructs the hard access management portion 16 to transmit a carrier. The hard access management portion 16 checks whether there is a carrier on the transmission line 4 or not when the instruction from the timing controller 14 is received, reports the result of check to the timing controller 14, and if it does not detect any carrier, it transmits a carrier thereby securing the transmission line 4.

If the transmission of a packet is possible, the timing controller 14 reports the fact to the buffer controller 11, and also sends the next frame transmitting timing information NFT to the transmitting timing adder 13. The buffer controller 11 instructs the frame assembler 12 to assemble a frame, and the frame assembler 12 inputs the assembled frame to the transmitting timing adder 13. The transmitting timing adder 13 adds the next frame transmitting timing information NFT to the frame to be transmitted and also instructs the hard access management portion 16 to transmit the frame. The hard access management portion 16 then transmits the frame to the lower layer (LAN).

If the hard access management portion 16 detects a collision during the transmission of the frame, it suspends the transmission process so as to report the result of transmission (occurrence of a collision) to the buffer controller 11, and also sends a request for canceling the transmitting timing to the timing controller 14. When the timing controller 14 receives the request for canceling the transmitting timing, it cancels the reserved transmitting timing (the next frame transmitting timing which is added to the collided frame) in the timing reservation management table 15. When a buck-off time is elapsed, the buffer controller 11 sends a message requesting transmission of the frame to the timing controller 14 again, and the above-mentioned processing is repeated as to the frame which has not been successfully transmitted.

On the other hand, if the frame is successfully transmitted without an occurrence of a collision, the hard access management portion 16 reports the result of transmission to the buffer controller 11, and the buffer controller 11 eliminates the packet corresponding to the transmitted frame from the queue.

In the above explanation, the received packet is a leading preferential packet. If the received packet is a non-leading preferential packet or a general packet, the packet is queued in the buffer. The queued packet is then transmitted at the next frame transmitting timing which is reserved in the timing reservation management table 15 or a vacant timing. More specifically, when the timing controller 14 detects the next frame transmitting timing reserved in the table 15, it notifies the buffer controller 11 about the start of transmission of a frame. The buffer controller 11 then sends a message requesting the transmission of the frame as to the non-leading preferential packet in the queue to the timing controller 14. When the timing controller 14 receives the message, it executes a processing similar to that executed when it receives the leading preferential packet. The buffer controller 11 controls the transmission of a general packet in the queue at a vacant timing.

(b) Fundamental Operation at the Time of Receiving a Frame

The fundamental operation at the time of receiving a frame will next be explained.

A frame sent from the lower layer (LAN) is received by the hard access management portion 16, and sent to the receiving timing extractor 18. The receiving timing extractor 18 extracts the next frame transmitting timing information NFT from the received frame and inputs the timing information NFT to the timing controller 14, and also eliminates the next frame transmitting timing information NFT from the frame and inputs the frame to the frame disassembler 17.

The timing controller 14 reserves the next frame transmitting timing information NFT received from the receiving timing extractor 18 in the timing reservation control table 15 as the timing of transmitting a frame by other terminal. Incidentally, as to a frame to which the next frame transmitting timing information NFT is not added, this reservation step is naturally skipped. The frame disassembler 17 disassembles the received frame, and transmits necessary information to the upper layer.

(E) Processing by Each Element (a) Packet Receiving Process

Packet receiving processing will be explained with a case of transmitting and receiving a sound frame of 64 bytes every 20 msec via the LAN of 10 Mbps taken as an example. The 20 msec is the generally known interval with which a packet generates when sound is transmitted by an IP packet.

(a-1) Processing by the Buffer Controller

Figure 7:
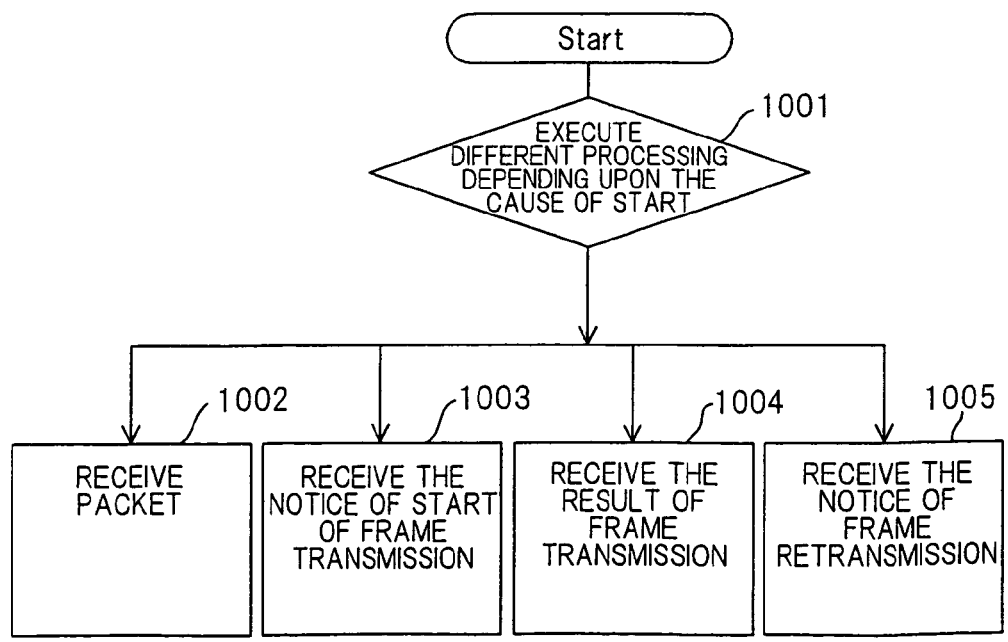
FIG. 7 is a flowchart of the processing executed by a buffer controller.

The buffer controller 11 of the LAN interface portion (FIG. 3) judges the main cause of the start (step 1001), and executes the processing in accordance with the main cause of the start, as shown in FIG. 7 (steps 1002 to 1005). More concretely, when the buffer controller 11 receives a packet from the upper layer, it executes a packet reception processing (step 1002), while if it is notified by the timing controller 14 at the next frame transmitting timing that the transmission of a frame is started, it executes a processing for receiving the notice of the start of the transmission of a frame (step 1003). When the buffer controller 11 receives the result of the transmission of a frame (success or failure in the transmission) from the hard access management portion 16, it executes the processing for receiving the result of the transmission of the frame (step 1004), while if it is notified by the hard access management portion 16 when the backoff time is elapsed after the detection of a collision that a frame is retransmitted, it executes the processing of receiving the notice of the retransmission of the frame (step 1005).

Figure 8:
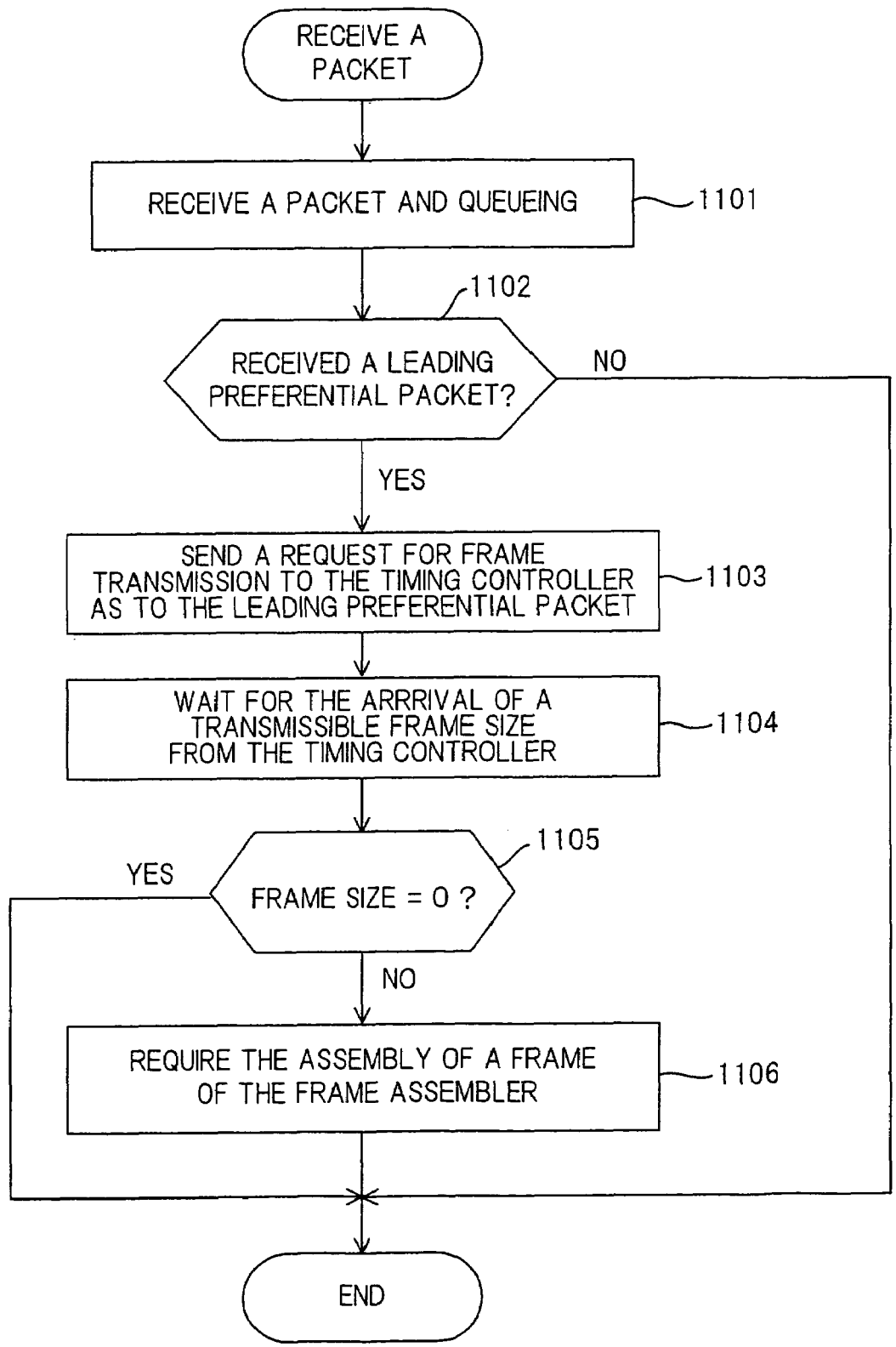
FIG. 8 is a flowchart of a packet receiving process.

FIG. 8 is a flowchart of the packet receiving process of the buffer controller 11. When the buffer controller 11 receives a packet from the upper layer, it queues the packet in the buffer (step 1101), checks whether the received packet is a leading preferential packet or not, and if it is not the leading preferential packet, the process is finished. On the other hand, if it is the leading preferential packet, the buffer controller 11 sends a request for the transmission of a frame related to the leading preferential packet to the timing controller 14 in the message format shown in FIG. 9A (step 1103). Additionally, if the received packet is the leading preferential packet, the upper layer indicates "next frame transmitting timing=after 20 msec, type of packet=leading preferential packet" in the packet header. If the received packet is a non-leading preferential packet, the upper layer indicates "next frame transmitting timing=after 20 msec, type of packet=non-leading preferential packet" in the packet header. If the received packet is a general packet, the upper layer indicates "type of packet=general packet" in the packet header, and the next frame transmitting timing is not indicated.

After the buffer controller 11 transmits the request for the transmission of a frame to the timing controller 14 in the above-described way, it waits for the arrival of a transmissible frame size from the timing controller 14. (step 1104). When the timing controller 14 receives the request for the transmission of a frame from the buffer controller 11, it calculates the transmissible frame size, and sends a message to the buffer controller 11. The message is "transmissible frame size=0", if transmission is impossible, and "transmissible frame size ≠ 0", if transmission is possible.

When the buffer controller 11 receives a transmissible frame size, it checks whether the frame size is zero or not (step 1105), and if it is zero, the process ends. Unless the frame size is zero, the frame is transmissible, so that the buffer controller 11 requires the assembly of the frame of the frame assembler 12 (step 1106), thereby finishing the process.

(a-2) Processing by the Timing Controller

Figure 10:
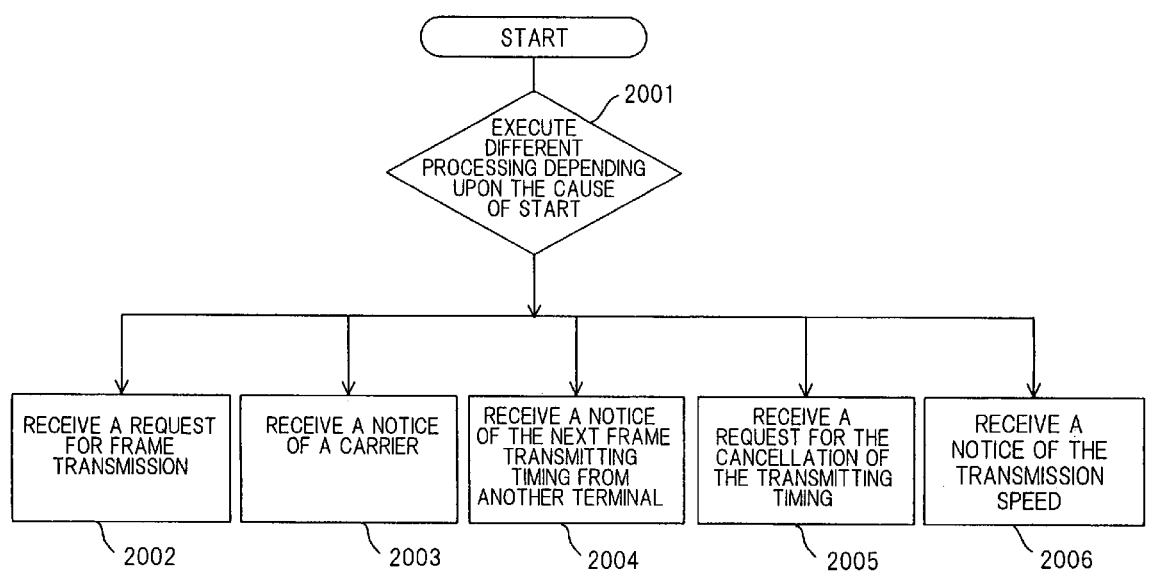
FIG. 10 is a flowchart of the main process executed by a timing controller.
Figure 11:
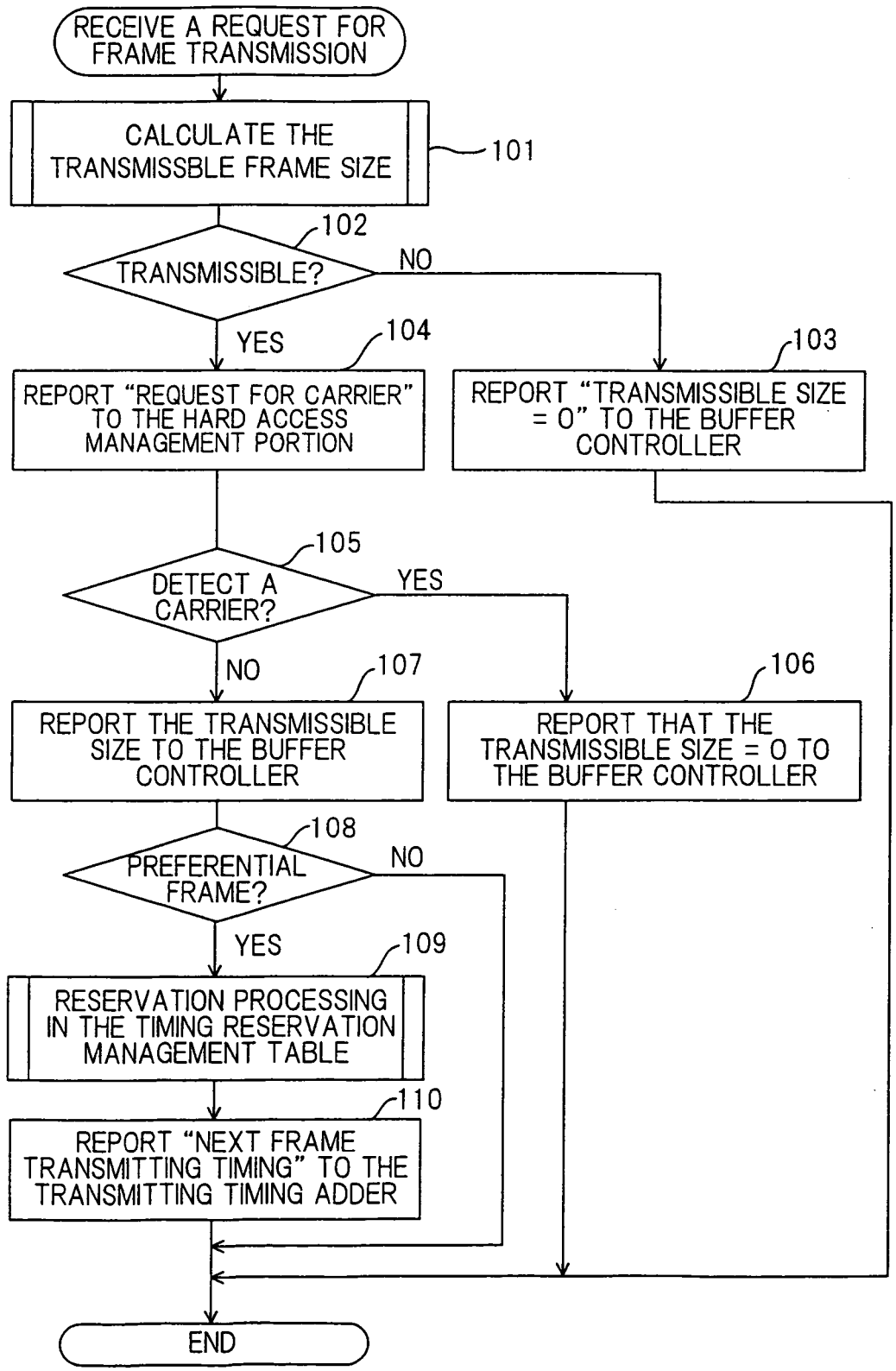
FIG. 11 is a flowchart of a process executed when a request for transmission of a frame or a notice of a carrier is received.
Figure 12:
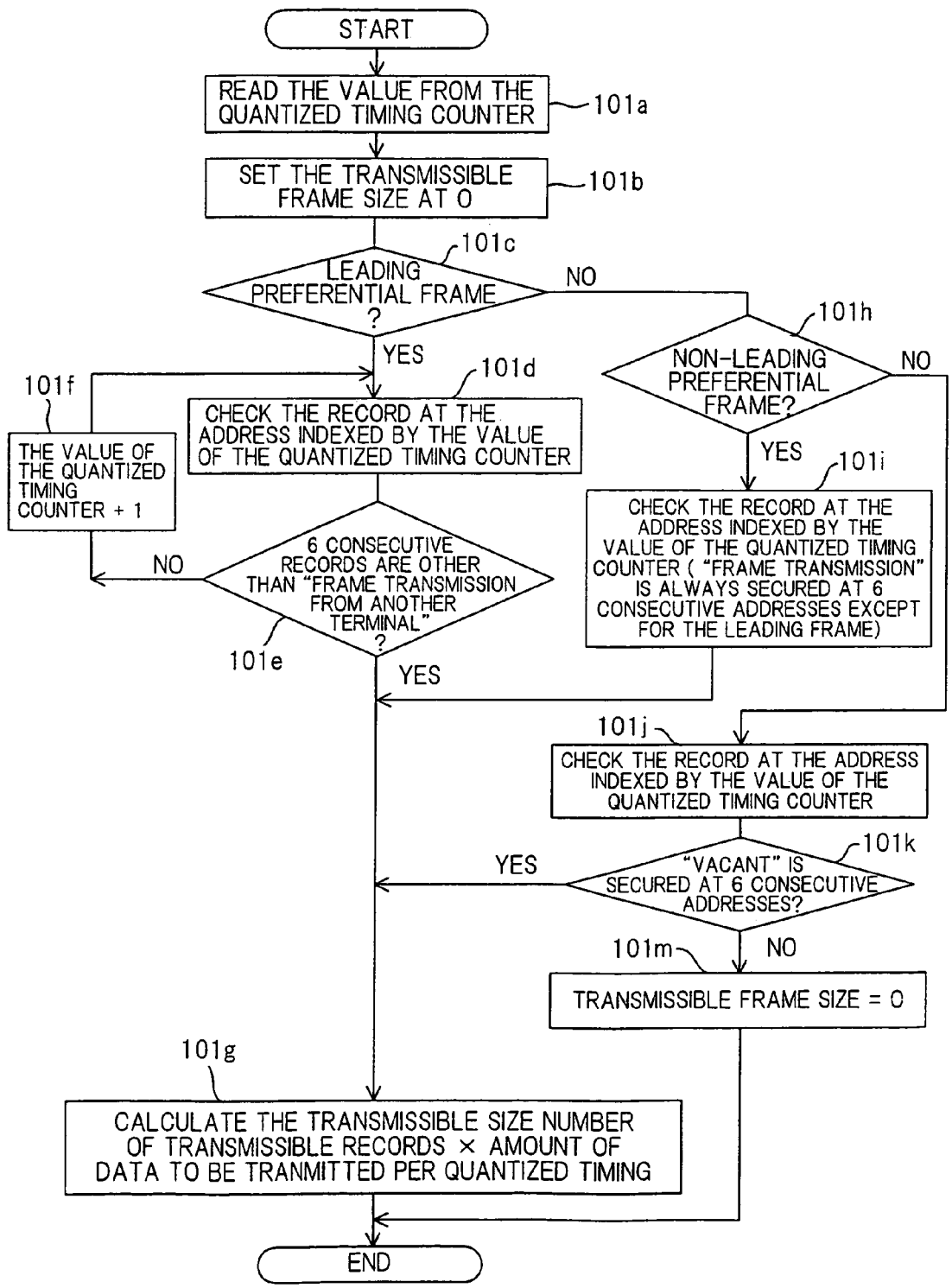
FIG. 12 is a flowchart of a process of calculating a transmissible frame size.

The timing controller 14 to which the request for the transmission of a frame is sent executes a transmitting timing control processing in accordance with the flowchart shown in FIGS. 10 to 13. FIG. 10 is a flowchart of the main processing by the timing controller 14, FIG. 11 is a flowchart of a processing at the time of receiving a request for the transmission of a frame or carrier information, FIG. 12 is a flow chart of a process of calculating a transmissible frame size shown in FIG. 11, and FIG. 13 is a flowchart of the reservation processing shown in FIG. 11.

The timing controller 14 judges the main cause of the start (step 2001), as shown in FIG. 10, and executes a processing of receiving the request for the transmission of a frame (step 2002), a processing of receiving a notice of a carrier (step 2003), a processing of receiving a notice of the next frame transmitting timing from other terminal (step 2004), a processing of receiving a request for the cancellation of the transmitting timing (step 2005), and a processing of receiving a notice of the transmission speed (step 2006).

When the timing controller 14 receives a request for the transmission of a frame from the buffer controller 11, it starts the processing of receiving a request for the transmission of a frame at the step 2002 in accordance with the flow shown in FIG. 11. That is, when the timing controller 14 receives a—request for the transmission of a frame from the buffer controller 11, it calculates the transmissible frame size (step 101). In order to calculate the transmissible frame size (see FIG. 12), it first reads the count value (quantized timing) of the timer (quantized timing counter) 14*a* and sets the transmissible frame size at 0 (steps 101*a* to 101*b*). The timing controller 14 then checks whether the frame as the object of transmission is a leading preferential frame or not (step 101*c*).

If the frame is a leading preferential frame, the timing controller 14 confirms the status of the 6 consecutive addresses from the record of the timing reservation managing table 15 which are indicated by a quantized timing counter value A so as to check whether a record other than "frame transmission by other terminal" continues at the 6 consecutive addresses (steps 101d to 101e) or not. If the 6 consecutive records are 'vacant' or 'frame transmission by its own terminal', the transmission is possible. On the other hand, even if one record is 'frame transmission by other terminal', the transmission is impossible so that it is held back until it becomes possible. That is, the value of the quantized timing counter 14a is proceeded by one every 10 µsec (step 101f), and the transmission is held until 'vacant' or 'frame transmission by its own terminal' appears at 6 consecutive addresses, namely, until the transmission becomes possible.

If the frame is transmissible at the step 101e, the timing controller 14 calculates the transmissible size from the following formula (step 101g):

Transmissible size=the number of transmissible records×the amount (512 bits) of transmitted data per quantized timing When a request for the transmission of a frame is sent from the buffer controller 11 as to a non-leading preferential packet or a general packet, the frame as the object of transmission is not a leading preferential frame at the step 101c. In this case, whether the frame is a non-leading preferential frame or not is checked (step 101h). If it is a non-leading preferential frame, the record indicated by the count value (address) of the quantized timing counter 14a is checked so as to confirm that 'frame transmission' by its own terminal continues at the 6 consecutive addresses. Since the timing of transmitting a non-leading preferential frame is reserved, "frame transmission" continues at the 6 consecutive addresses (step 101i). Thereafter, the transmissible size is calculated at the step 101g.

On the other hand, if the frame as the object of transmission is not a preferential frame at the step 101h, the frame is a general frame. If it is a general frame, the timing controller 14 inspects the status of the record at 6 consecutive addresses indicated by the counter value (address) of the quantized timing counter 14a so as to check whether 'vacant' continues at the 6 consecutive addresses (steps 101j to 101k). If 'vacant' continues at the 6 consecutive addresses, transmission is possible, so that the timing controller 14 calculates a transmissible size at the step 101g. On the contrary, if 'vacant' does no continue at the 6 consecutive addresses, transmission is impossible, so that the transmissible size is set at 0 (step 101m).

The transmissible size is calculated in the above-described way. The transmissible size=0 means that transmission is impossible, while the transmissible size≠0 means that transmission is possible.

Returning to FIG. 11, when the calculation of the transmissible size is finished, the timing controller 14 checks whether transmission is possible or not by reference to the transmissible size (step 102). If transmission is impossible, the timing controller 14 reports that the transmissible size=0 to the buffer controller 11 (step 103).

If transmission is possible, the timing controller 14 sends a request for the transmission of a carrier signal to the hard access management portion 16 in a message format shown in FIG. 9B (step 104). When the transmission of a carrier signal is instructed, the hard access management portion 16 checks whether there is a carrier signal or not on the transmission line which are transmitted from other terminal, and reports the result of detection to the timing controller 14 in a message form shown in FIG. 9C. If no carrier is detected, the hard access management portion 16 secures the transmission line by transmitting a carrier.

The timing controller 14 checks whether a carrier sent from other terminal has been detected on the transmission line (step 105). If a carrier produced by other terminal has been detected, transmission is impossible, so that the timing controller 14 reports that the transmissible size=0 to the buffer controller 11 (step 106). On the other hand, if no carrier which has been produced from other terminal is detected on the transmission line, the timing controller 14 reports the transmissible size calculated at the step 101 to the buffer controller 11 in a message form shown in FIG. 9D (step 107).

The timing controller 14 then checks whether the frame as the object of transmission is a preferential frame or not (step 108), if it is a general frame, the timing controller 14 does not reserve a timing, while if it is a preferential frame, the timing controller 14 reserves a next frame transmitting timing in the timing reservation management table 15 (step 109) and reports the next frame transmitting timing to the transmitting timing adder 13 (step 110).

The processing of reserving a next frame transmitting timing at the step 109 is executed in accordance with the flow shown in FIG. 13. Since the next frame transmitting timing is 'after '20 msec', the address width ΔA corresponding to 20 msec is obtained (step 109a). Since 1 address is 10 µsec, ΔA=20 msec/10 µsec=2000 is obtained.

Thereafter, the address width ΔA is added to the address A indicated by the quantized timing counter 14a so as to obtain the address (A+ΔA) of 20 msec (2000 records) ahead, and the statuses of the 6 consecutive records are inspected from the record of the address (A+ΔA) by reference to the timing reservation management table 15. That is, it is checked whether there are 6 consecutive records of 'vacant' or not (step 109e). The '6 records' here means the number of addresses which corresponds to the time 60 µsec required for the frames (64 bytes) to be transmitted.

If the 6 consecutive records are not 'vacant', ΔA is proceeded by one (ΔA+1→ΔA) and the processing at the step 109b and thereafter is repeated. If the 6 consecutive records are 'vacant', 'frame transmission by its own terminal' is written into the 6 consecutive vacant addresses (step 109e), thereby finishing the reservation processing.

(a-3) Processing by the Frame Assembler

The buffer controller 11 to which the transmissible frame size shown in FIG. 9D is reported requests the assembly of a frame to the frame assembler 12 in the message format shown in FIG. 14A. The frame assembler 12 of which the assembly of a frame is required produces a frame to be transmitted, and reports the end of assembly of a frame to be transmitted to the transmitting timing adder 13 in the message format shown in FIG. 14B.

(a-4) Processing by the Transmitting Timing Adder

Figure 15:
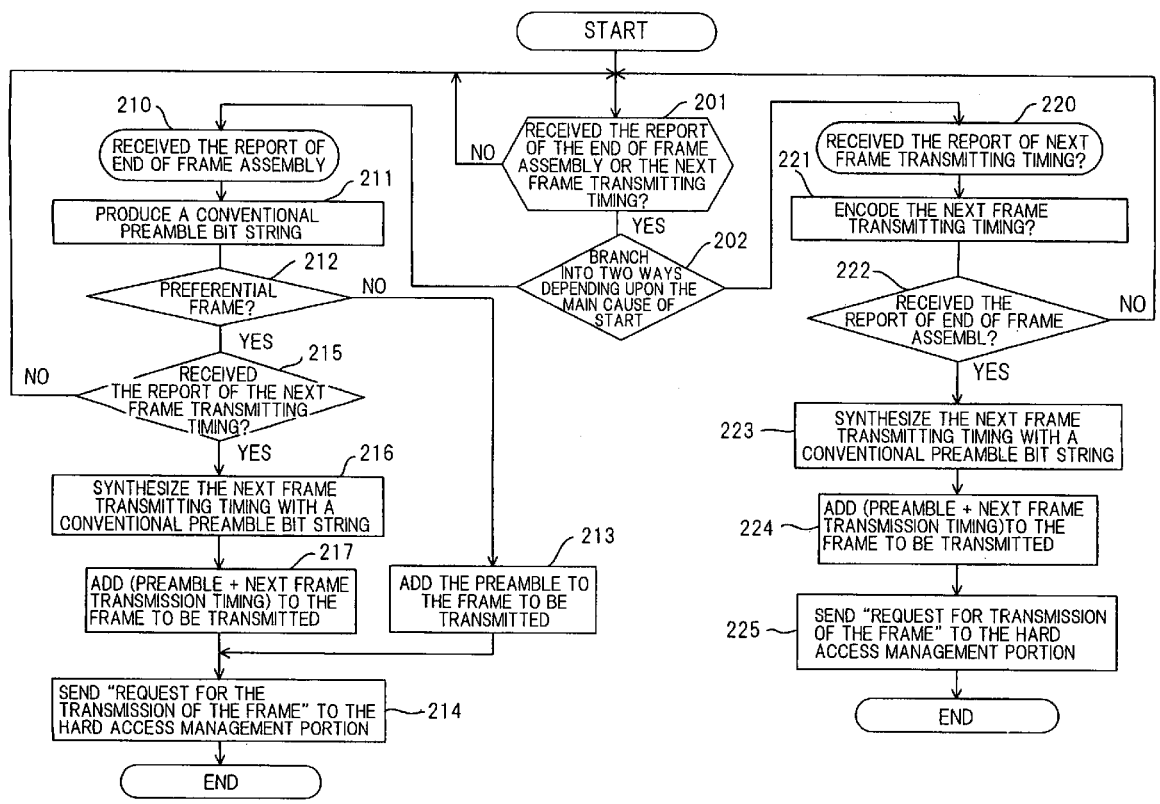
FIG. 15 is a flowchart of a process of adding the timing information.

The transmitting timing adder 13 which has received the next frame transmitting timing information and the report of the end of assembly encodes the next frame transmitting timing in accordance with the flow shown in FIG. 15 in the following way. First, a unit of 1 msec is represented by '10', so that 20 msec corresponds to a string of consecutive 40 bits of '10'. '00' and '0' are then placed before and after, respectively, the consecutive 40 bits of '10', and these bits are synthesized with the front portion of the preamble PA (see FIG. 6A). The transmitting timing adder 13 then adds the preamble synthesized with the bit string of next frame transmitting timing to the frame to be transmitted, and sends a request for transmission to the hard access management portion 16 in the message format shown in FIG. 14C.

Specifically, the transmitting timing adder 13 checks whether the next frame transmitting timing information or the report of the end of assembly has been reached (step 201), and if the answer is in the affirmative, the following operation of the transmitting timing is branched into two ways depending upon the cause of the start (step 202). If the report of the end of assembly is the first to be received, the processing at the step 210 and thereafter is executed, while the next frame transmitting timing information is the first to be received, the processing at the step 220 and thereafter is executed.

If the report of the end of assembly is the first to be received, the transmitting timing adder 13 produces a conventional preamble bit string (step 211). Then, it checks whether the frame as the object of transmission is a preferential frame or not (step 212), and if the answer is in the negative, the preamble is added to the frame to be transmitted (step 213). The transmitting timing adder 13 sends a request for the transmission of the frame to the hard access management portion 16 in the message format shown in FIG. 14C.

If the frame as the object of transmission is a preferential frame at the step 212, the transmitting timing adder 13 checks whether it has received the next frame transmitting timing information or not (step 215), and if the answer is in the negative, the process returns to the step 201 so as to wait for the arrival of next frame transmitting timing information. If the transmitting timing adder 13 receives the next frame transmitting timing information, it encodes the next frame transmitting timing (step 221), and checks whether the report of the end of assembly has been received or not (222). Since it has already been received, the next frame transmitting timing is synthesized with the conventional preamble bit string (step 223), and the (preamble+next frame transmitting timing) obtained by the synthesis is added to the frame to be transmitted (step 224). The transmitting timing adder 13 then sends a request for the transmission of the frame to the hard access management portion 16 in the message format shown in FIG. 14C (step 225).

On the other hand, if the next frame transmitting timing information is the first to be received at the step 201, the transmitting timing adder 13 encodes the next frame transmitting timing information (step 221), and checks whether the report of the end of assembly has been received (222). Since it has not been received yet, the process returns to the step 201 so as to wait for the arrival of the report of the end of assembly. When the report of the end of assembly is received, a conventional preamble bit string is produced (step 211). Since the frame as the object of transmission is a preferential frame, whether the next frame transmitting timing information has been received or not is checked (step 215). Since it has already been received, the next frame transmitting timing information is synthesized with the conventional preamble bit string (step 216), and the (preamble+next frame transmitting timing) obtained by the synthesis is added to the frame to be transmitted (step 217). The transmitting timing adder 13 then sends a request for the transmission of the frame to the hard access management portion 16 (step 214).

In the above-described example, the transmitting timing adder 13 adds a transmitting timing to the front portion of a preamble. It is also possible to represent the next frame transmitting timing information by the first 4 bytes of a carrier extension, as shown in FIG. 6B and to send a request for the transmission of the frame to the access management portion 16.

Figure 16:
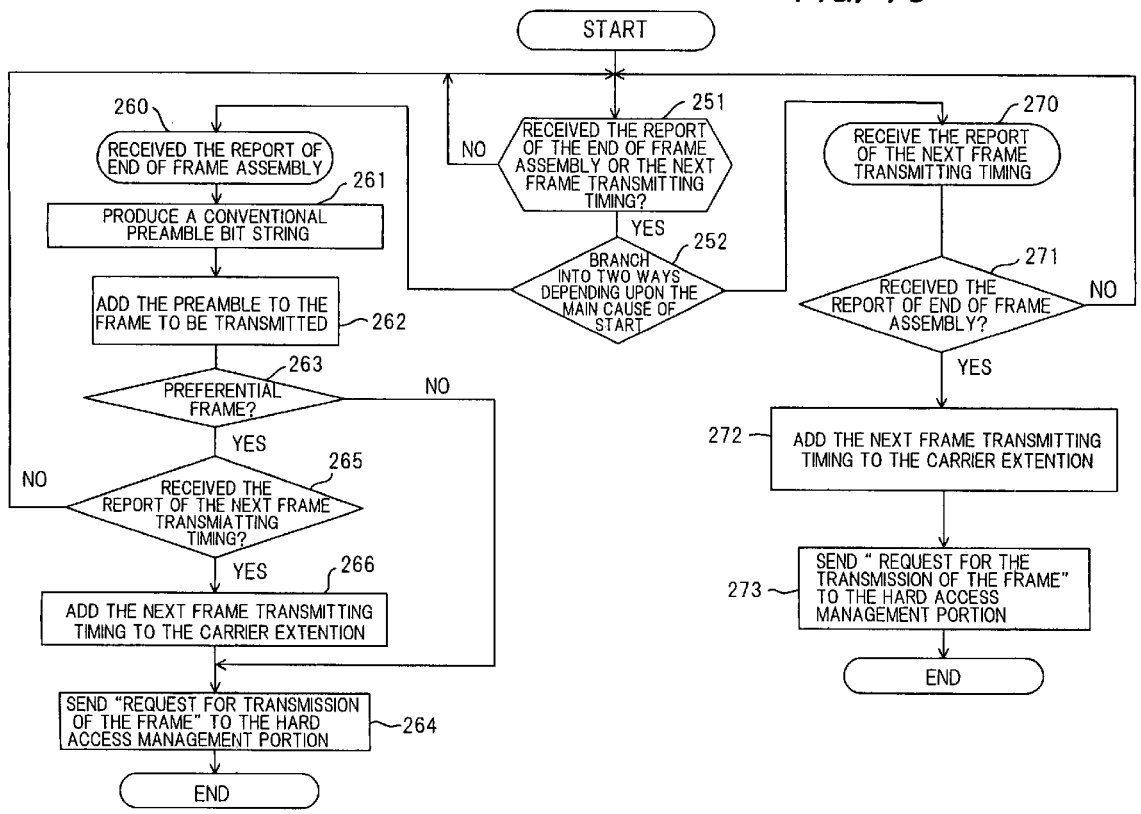
FIG. 16 is a flowchart of another process of adding the timing information.

FIG. 16 is a flowchart of the process for adding the next frame transmitting timing information in such a case. The transmitting timing adder 13 checks whether it has received the next frame transmitting timing information or the report of the end of assembly (step 251), and if the answer is in the affirmative, the following operation of the transmitting timing is branched into two ways depending upon the cause of the start (step 252). If the report of the end of assembly is the first to be received, the processing at the step 260 and thereafter is executed, while the next frame transmitting timing information is the first to be received, the processing at the step 270 and thereafter is executed.

If the report of the end of assembly is the first to be received, the transmitting timing adder 13 produces a conventional preamble bit string (step 261). Then, it checks whether the frame as the object of transmission is a preferential frame or not (step 263), and if the answer is in the negative, it sends a request for the transmission of the frame to the hard access management portion 16 (step 264).

If the frame as the object of transmission is a preferential frame at the step 263, the transmitting timing adder 13 checks whether it has received the next frame transmitting timing or not (step 265), and if the answer is in the negative, the process returns to the step 251 so as to wait for the report of a next frame transmitting timing. If the transmitting timing adder 13 receives the report of a next frame transmitting timing, it checks whether the end of assembly has been received (271). Since it has already been received, the next frame transmitting timing is added to the carrier extension (step 272). The transmitting timing adder 13 then sends a request for the transmission of the frame to the hard access management portion 16 (step 273).

On the other hand, if the next frame transmitting timing is the first to be received, the transmitting timing adder 13 checks whether the end of assembly has been received (271). Since it has not been received yet, the process returns to the step 251 so as to wait for the arrival of the report of the end of assembly. When the end of assembly is received, a conventional preamble bit string is produced (step 261). The preamble is then added to the frame to be transmitted (step 262), and whether the frame as the object of transmission is a preferential frame or not is checked (step 263). Since it is a preferential frame, whether the next frame transmitting timing has been received or not is checked (step 265). Since it has already been received, the next frame transmitting timing is represented by the first 4 bytes of the carrier extension (step 266). The transmitting timing adder 13 then sends a request for the transmission of the frame to the hard access management portion 16 (step 264).

(a-5) Processing by the Hard Access Management Portion

The hard access management portion 16 to which the request of the transmission of a frame shown in FIG. 14C is sent transmits the frame to the lower layer (LAN). When it detects a collision during the transmission of the frame, it suspends the process, and reports the detection of a collision to the buffer controller 11 as a result of the transmission of the frame in the message format shown in FIG. 17A. At the same time, the hard access management portion 16 requests the cancellation of the frame timing of the timing controller 14 in the message formant shown in FIG. 17B. When a back-of time is elapsed after the detection of the collision, the hard access management portion 16 requests the retransmission of the frame of the buffer controller 11 in the message format shown in FIG. 17C.

Figure 17A:
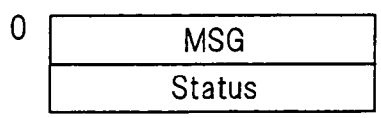
FIGS. 17A to 17C show the formats of various types of messages.
Figure 18:
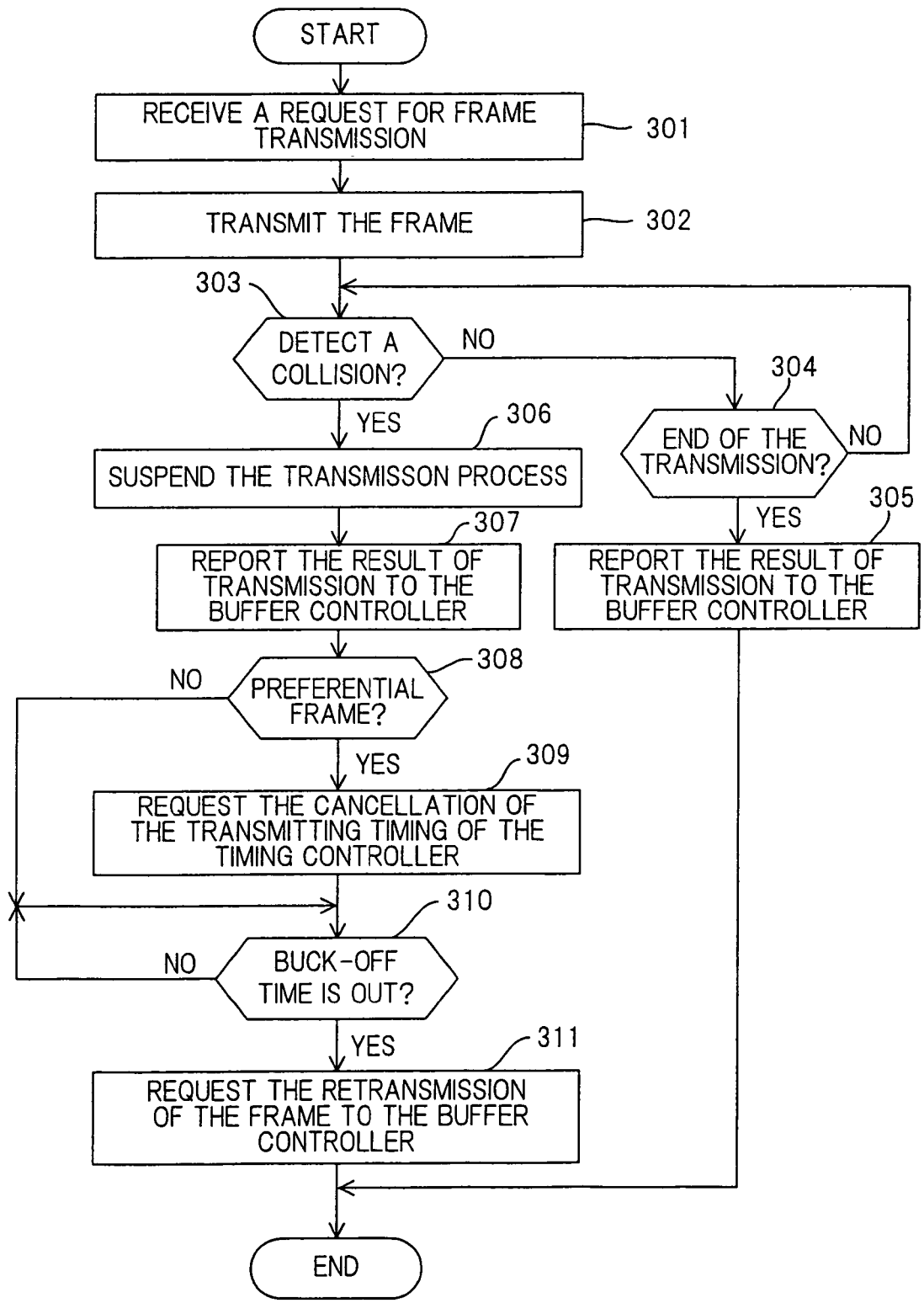
FIG. 18 is a flowchart of a process of transmitting a frame by a hard access management portion.

FIG. 18 is a flowchart of the processing of the transmission of a frame by the hard access management portion 16. When the hard access management portion 16 receives the request for the transmission of a frame from the transmitting timing adder 13 (step 301), it transmits the frame (step 302). During transmission, the hard access management portion 16 monitors to see whether there is a collision or not (step 303), and if the transmission is finished without detection of any collision, it reports the result of the transmission of a frame to the buffer controller 11 in the message format shown in FIG. 17A (steps 304~305).

Figure 17B:
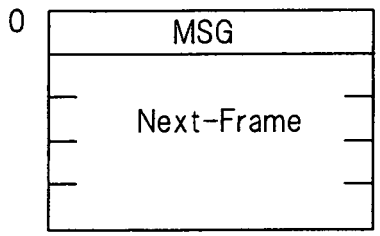
Figure 19:
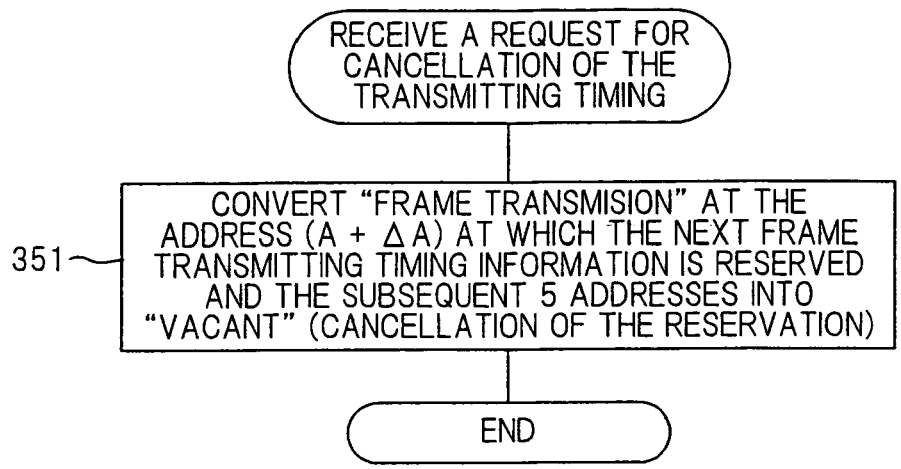
FIG. 19 is a flowchart of a process carried out when a request for cancellation of the timing of transmission is received.

On the other hand, if a collision is detected at the step 303, the transmission process is immediately suspended (step 306) and the result of the transmission of the frame is reported to the buffer controller 11 in the message format shown in FIG. 17A (step 307). Then, the hard access management portion 16 checks whether the collided frame is a preferential frame or not (step 308). Incidentally, there is no collision of a non-leading preferential frame. If it is a preferential frame, the hard access management portion 16 sends a request (FIG. 17B) for the cancellation of the transmitting timing to the buffer controller 14 in order to avoid duplication of the reservation of the next frame transmitting timing (step 309). The timing controller 14 thereby eliminates the reservation of the next frame transmitting timing information NFT from the table 15. More specifically, when the timing controller 14 receives the request for the cancellation of the transmitting timing, it eliminates the reservation by writing 'vacant' at the address (A+ΔA) at which the next frame transmitting timing information NFT is reserved and the subsequent consecutive 5 addresses, as shown in FIG. 19. The address (A+ΔA) is the address 20 msec after the address which corresponds to the next frame transmitting timing contained in the request for the cancellation of the transmitting timing.

Thereafter, the hard access management portion 16 checks whether the back-off time has elapsed or not (step 310), and if the time has elapsed, it sends a request (FIG. 17C) for the retransmission of the frame to the buffer controller 11 (step 311).

Figure 20:
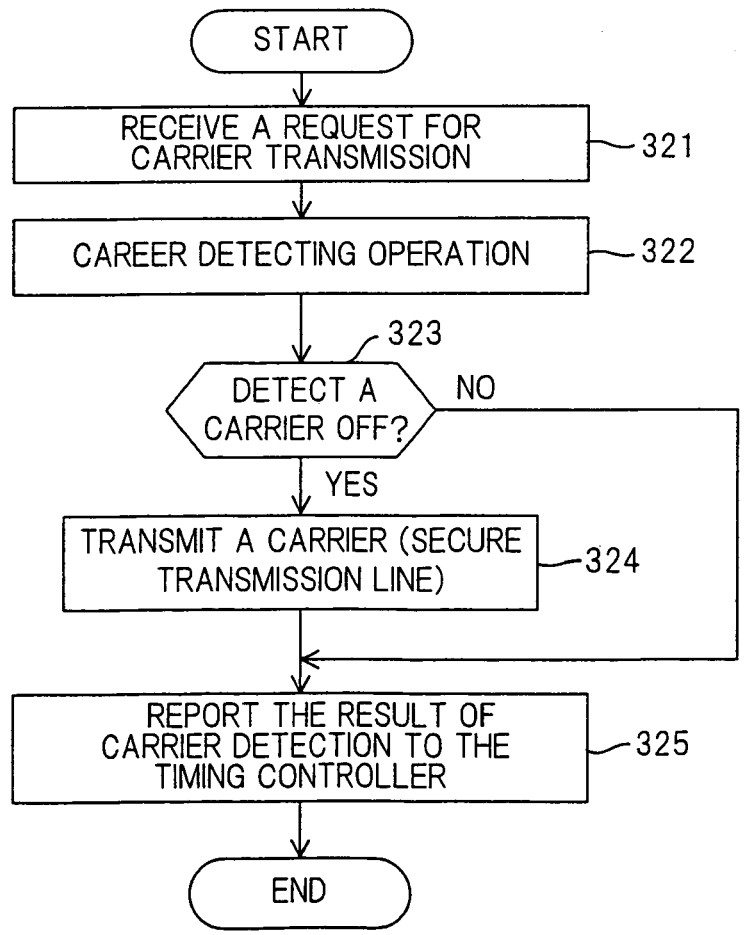
FIG. 20 is a flowchart of a process of transmitting a carrier by the hard access management portion.

The hard access management portion 16 also executes a carrier transmission/detection processing in accordance with the flow shown in FIG. 20. When the hard access management portion 16 receives the request for the transmission of a carrier from the timing controller 14 (step 321, see the step 104 in FIG. 11), it detects the presence or absence of a carrier on the transmission line (step 322). If there is no carrier, carrier is transmitted onto the transmission line, which is secured thereby (steps 323, 324), and thereafter, the result of the detection of a carrier is reported to the timing controller 14 (step 325).

Figure 21:
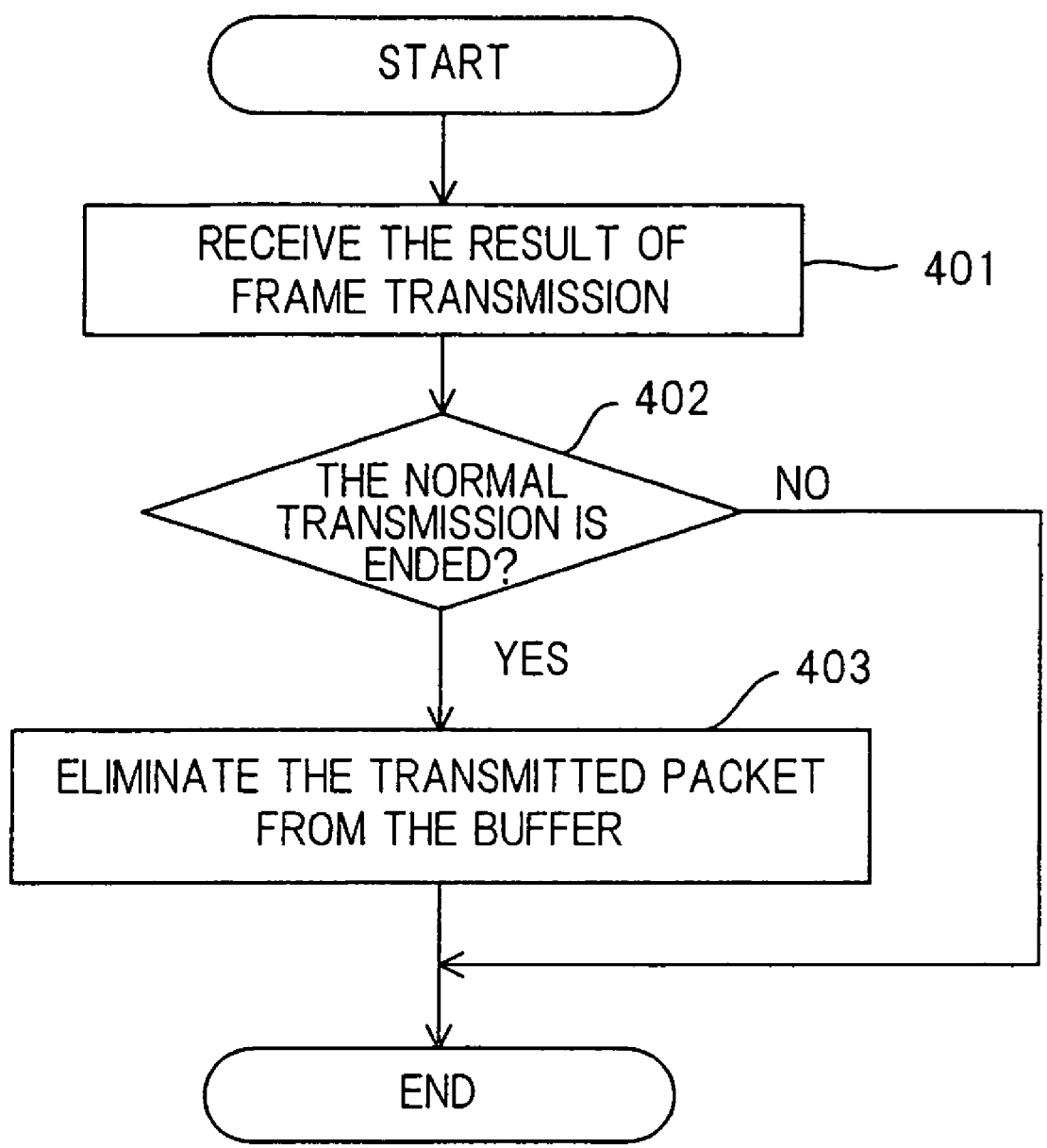
FIG. 21 is a flowchart of a process carried out when the result of the transmission of a frame is received.

(a-6) Processing of Receiving the Result of Transmission by the Buffer Controller When the buffer controller 11 receives the report of the result of the transmission of the frame shown in FIG. 17A from the hard access management portion 16, it executes the process shown in FIG. 21. When the buffer controller 11 receives the result of the transmission of the frame (step 401), it checks whether the normal transmission is finished or not (step 402), and if the answer is in the affirmative, it eliminates the packet from the buffer (step 403), thereby ending the process. On the other hand, if the answer is in the negative at the step 402, that is, if a collision is detected, the process is not executed until it receives the request for the retransmission of the frame shown in FIG. 17C.

(a-7) Processing by the Buffer Controller at the Time of Receiving the Report of the retransmission of the frame.

Figure 17C:
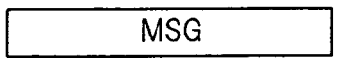
Figure 22:
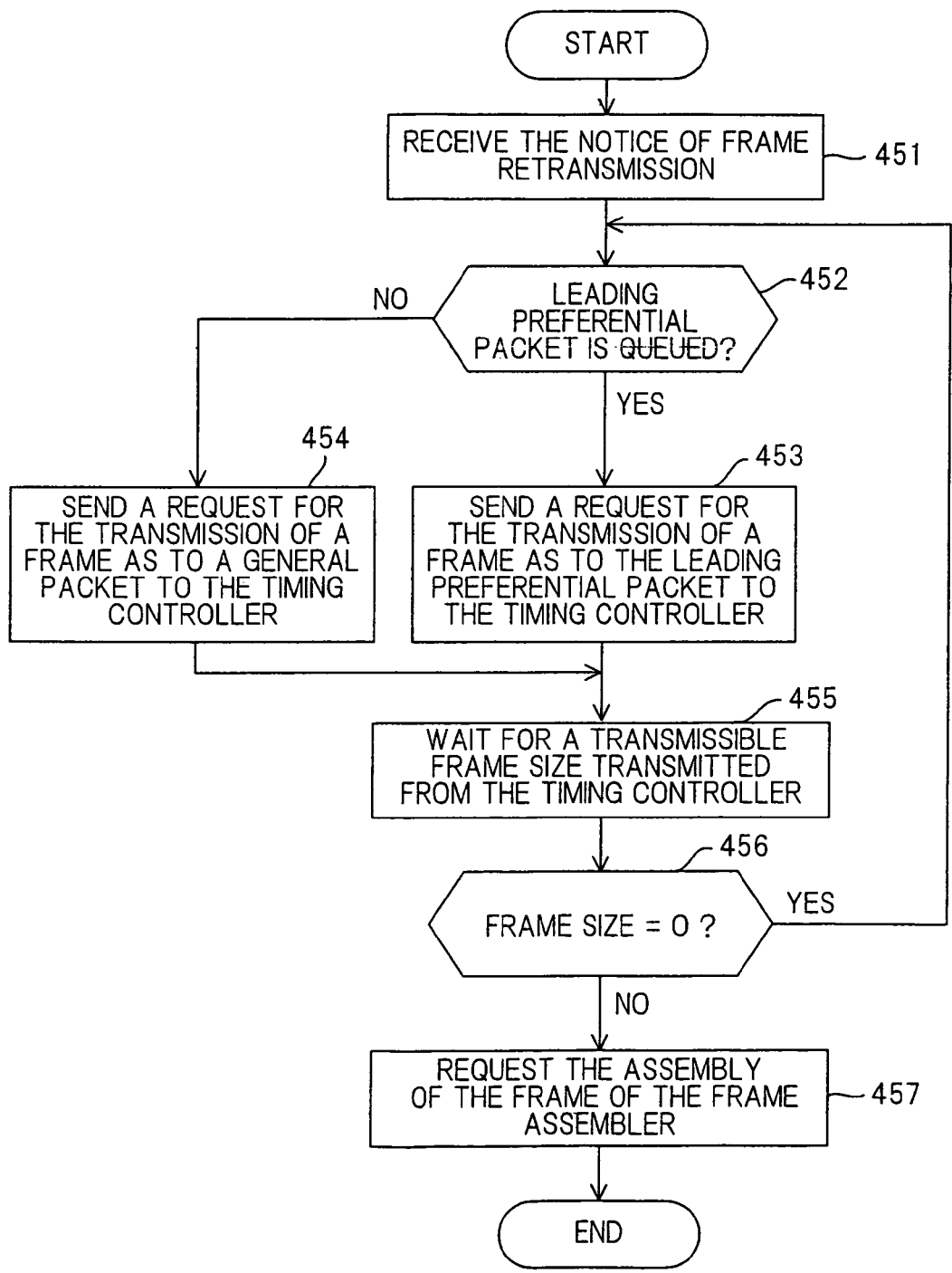
FIG. 22 is a flowchart of a process carried out when a notice of retransmission of a frame is received.
Figure 25:
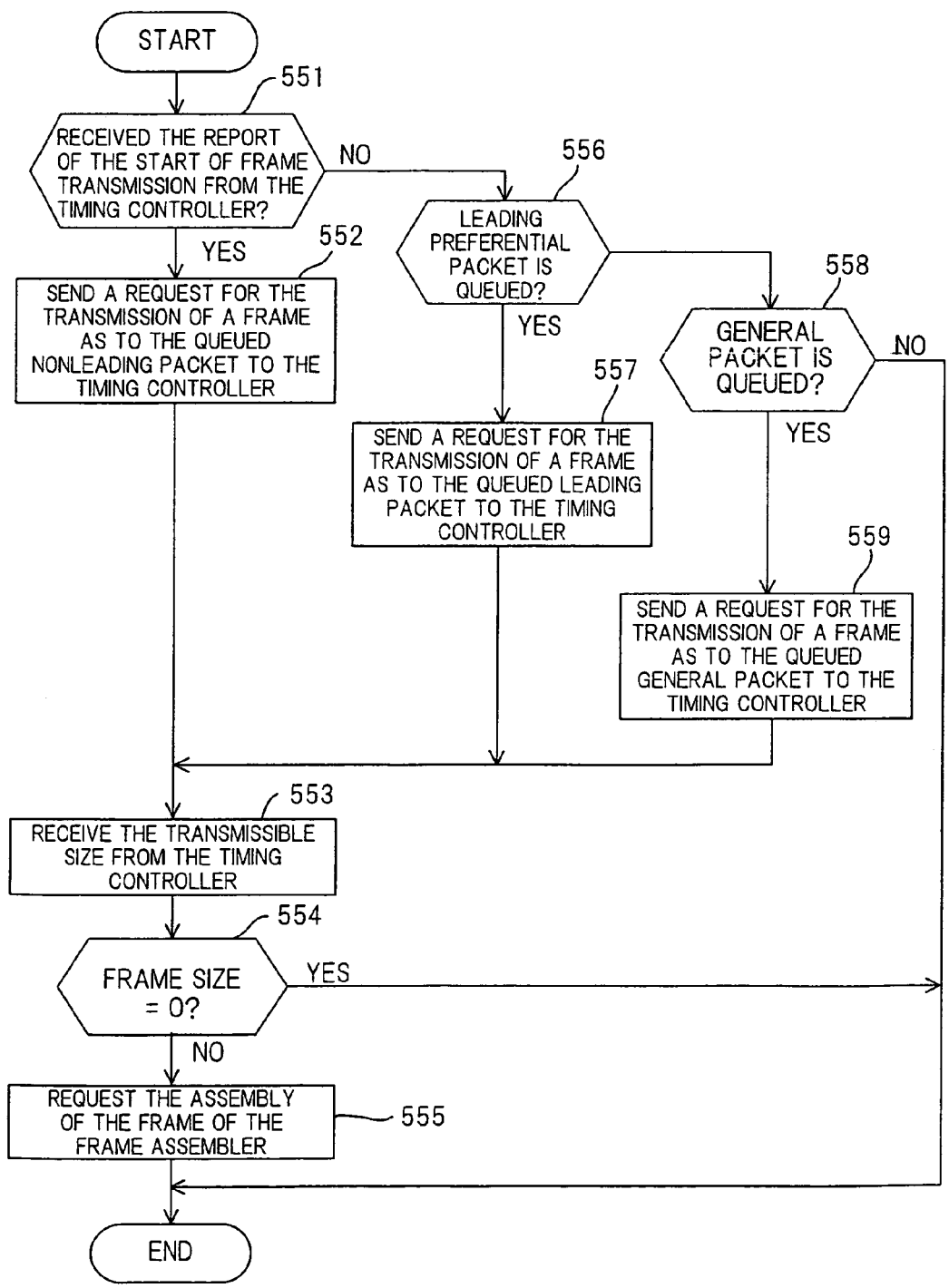
FIG. 25 is a flowchart of a process carried out when a notice of the start of transmission of a frame is received.

When the buffer controller 11 receives the request for the retransmission of the frame shown in FIG. 17C from the hard access management portion 16, it executes the process shown in FIG. 22. When the buffer controller 11 receives the request for the retransmission of the frame (step 451), it checks whether the leading preferential packet is queued or not (step 452). If the answer is in the affirmative, it sends a request for the transmission of a frame to the timing controller 14 as to the leading preferential packet (step 453), while if the answer is in the negative, it sends a request for the transmission of a frame as to a general packet (step 454). Since the transmitting timing of a non-leading preferential packet is reserved so that the packet does not collide, and it is transmitted in accordance with the reservation, it never collides.

Thereafter, the buffer controller 11 waits for a transmissible frame size sent from the timing controller 14 (step 455). When it receives the transmissible frame size, it checks whether the frame size is zero or not (step 456). If the frame size is zero, the processing at the step 452 and thereafter is repeated, while if the frame size is not zero, the buffer controller 11 sends a request for the assembly of the frame to the frame assembler 12 (step 457), thereby ending the process.

(b) Processing at the Time of Reserved Transmission Time

The processing by each part executed when a packet is received from the upper layer is described above. The processing of the transmission of a frame executed when the transmission time reserved in the timing reservation management table 15 comes is as follows.

(b-1) The Processing by the Timing Controller

The timing controller 14 updates the count value (address A) of the quantized timing counter (timer) 14a every 10 μsec, as shown in FIG. 23, and refers to the record at the address A of the timing reservation management table 15 (step 502) in order to check whether 'the transmission of a frame by its own terminal' is recorded at the address A or not, in other words, whether the reserved transmitting timing has come or not (step 503). If the answer is in the negative, the process is ended, while if the answer is in the affirmative, 'notice of the start of frame transmission' shown in FIG. 24 is transmitted to the buffer controller 11 (step 504), and the above-described processing is repeated.

(b-2) Processing by the Buffer Controller

The buffer controller 11 checks whether it has received the 'notice of the start of frame transmission' from the timing controller 14 (step 551), and if the answer is in the affirmative, it sends a request for the transmission of a frame to the timing controller 14 as to the queued non-leading preferential packet (step 552), and waits for a transmissible size sent from the timing controller 14 (step 553j. If it receives the transmissible size, it checks whether the frame size is zero or not (step 554), and if it is zero, the process is finished, while if it is not zero, the buffer controller 11 sends a request for the assembly of the frame to the frame assembler 12 (step 555), thereby ending the process. Incidentally, in the case of a non-leading preferential packet, the transmissible size is never zero.

On the other hand, if the buffer controller 11 has not received the 'notice of the start of frame transmission' from the timing controller 14 at the step 551, it checks whether the leading preferential packet is queued or not (step 556). If the leading preferential frame is queued due to the detection of a carrier or the like, the buffer controller 11 sends a request for the transmission of a frame to the timing controller 14 as to the leading preferential packet (step 557), and then repeats the processing after the step 553.

If the leading preferential packet is not queued at the step 556, whether a general packet is queued or not is checked (step 558), and if the answer is in the negative, the process is ended. However, if a general packet is queued, the buffer controller 11 sends a request for the transmission of a frame as to the general packet (step 559), and executes the processing at the step 553 and thereafter.

Figure 26:
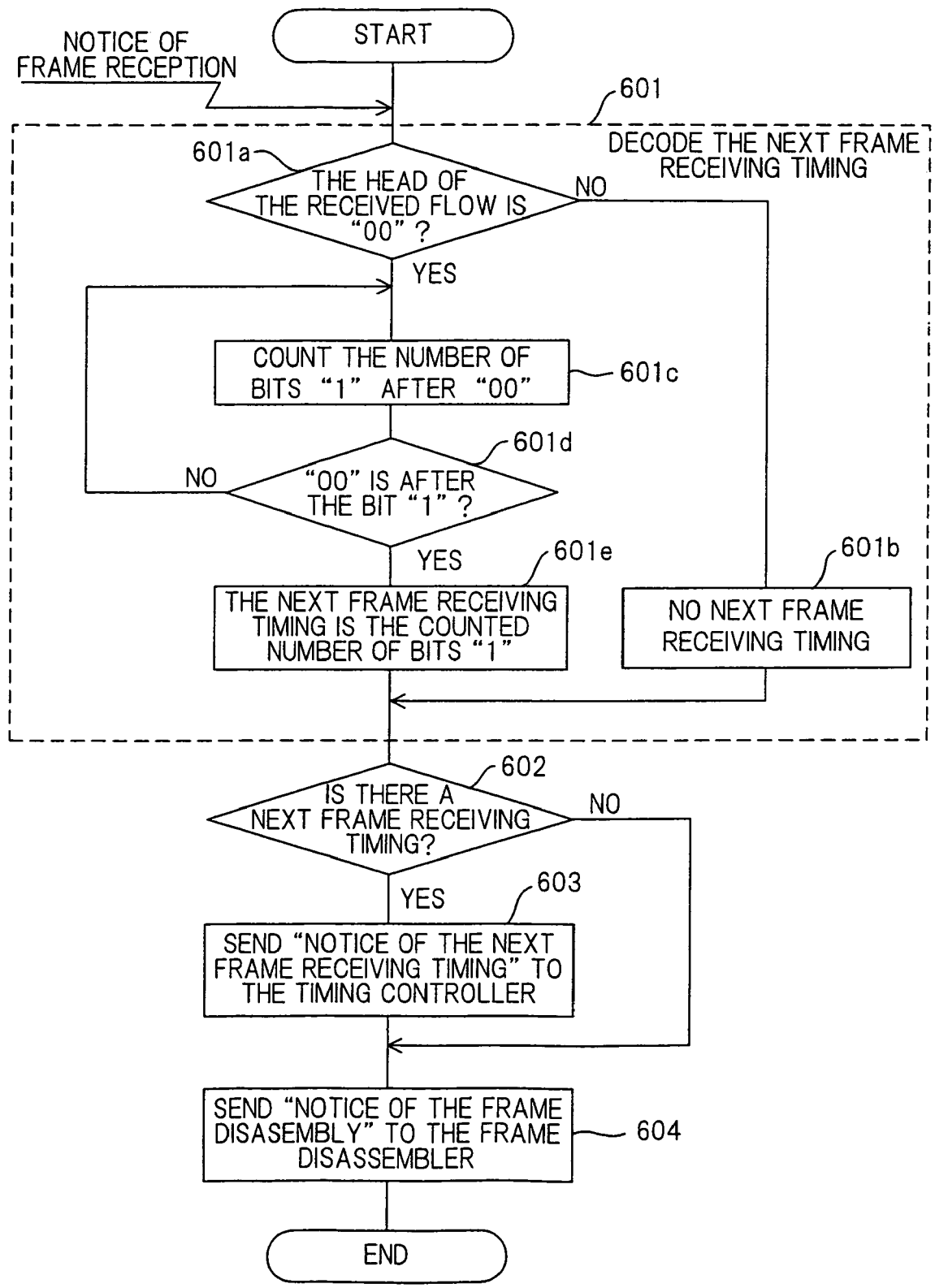
FIG. 26 is a flowchart of a process of extracting a timing of receiving a frame from another terminal.

(c) Processing of Extracting the Timing for Receiving a Frame from Other Terminal (c-1) In the Case in which the Next Frame Transmitting Timing Information is Added to the Front Portion of the Preamble FIG. 26 is a flowchart of the processing of extracting the timing of receiving a frame from other terminal by the receiving timing extractor 18. It is here assumed that the next frame transmitting timing information NFT is added to the front portion of the preamble PA, as shown in FIG. 6A, and that '00' and '0' are added after and before, respectively, the next frame transmitting timing information NFT.

Figure 27A:
FIGS. 27A to 27C show the formats of various kinds of messages.

When the hard access management portion 16 receives a frame from the LAN, it reports the reception of the frame to the receiving timing extractor 18 in the message format shown in FIG. 27A. The receiving timing extractor 18, to which the frame reception is reported, checks whether the head of the received frame is '00' or not (step 601*a*), and if the answer is in the negative, it judges that the next frame transmitting timing is not added to the received frame (step 601*b*).

If the head of the received frame is '00', the receiving timing extractor 18 decodes the timing for receiving a frame from other terminal (steps 601*c* to 601*e*). The decoding is executed by recognizing the portion of '00' to '0' as the next frame receiving timing portion, and counting the number of '1' therebetween.

Figure 27B:
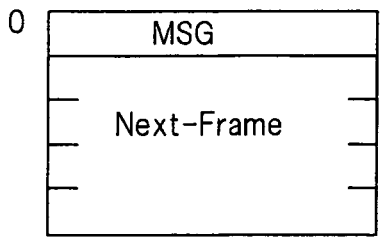

The receiving timing extractor 18 then checks whether a next frame transmitting timing is added or not (step 602), and if the answer is in the affirmative, it reports the next frame transmitting timing to the timing controller 14 in the message format shown in FIG. 27B (step 603).

The timing controller 14 records 'frame transmission by other terminal' at the address of the timing reservation management table 15 which corresponds to the reported timing. That is, if it is assumed that the address indexed by the quantized timing counter 14*a* is A and that the address width which corresponds to the next frame transmitting timing 20 msec is ΔA, the timing controller 14 writes 'frame transmission by other terminal' at the address (A+ΔA) and the subsequent 5 consecutive addresses of the timing reservation management table 15. In this case, the sum 23 $\mu$sec (corresponding to 3 addresses) of the propagation delay 13 $\mu$sec and the hardware rise time 10 $\mu$sec is considered as a correction time, and the address for writing is moved forward by that time. That is, the address width ΔA=2000 is corrected to ΔA=1997. If 'frame transmission by its own terminal' or 'frame transmission by other terminal' is already written at the addresses, the timing controller 14 searches for 6 consecutive vacant addresses, and writes 'frame transmission by other terminal' into the vacant addresses.

Figure 27C:
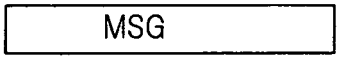

When the above processing is finished, the receiving timing extractor 18 sends a request for disassembly of the frame to the frame disassembler 17 in the message format shown in FIG. 27C (step 604). The frame disassembler 17, which has received the request for disassembly of the frame, disassembles the frame, and, after confirming that the destination address is its own terminal, sends the packet portion to the upper layer.

In the above explanation, it is assumed that the delay in frame propagation is 13 $\mu$sec, but the delay time changes in proportion to the distance between a transmitting terminal and a receiving terminal. Therefore, each terminal is kept at a distance from the reference position, and the distance of the transmitting terminal from the reference position is added together with the next frame transmitting timing to a frame to be transmitted. In this manner, the receiving terminal is capable of calculating the correct propagation delay, and reserving the exact timing by correcting the address width ΔA by using the propagation delay.

Figure 28:
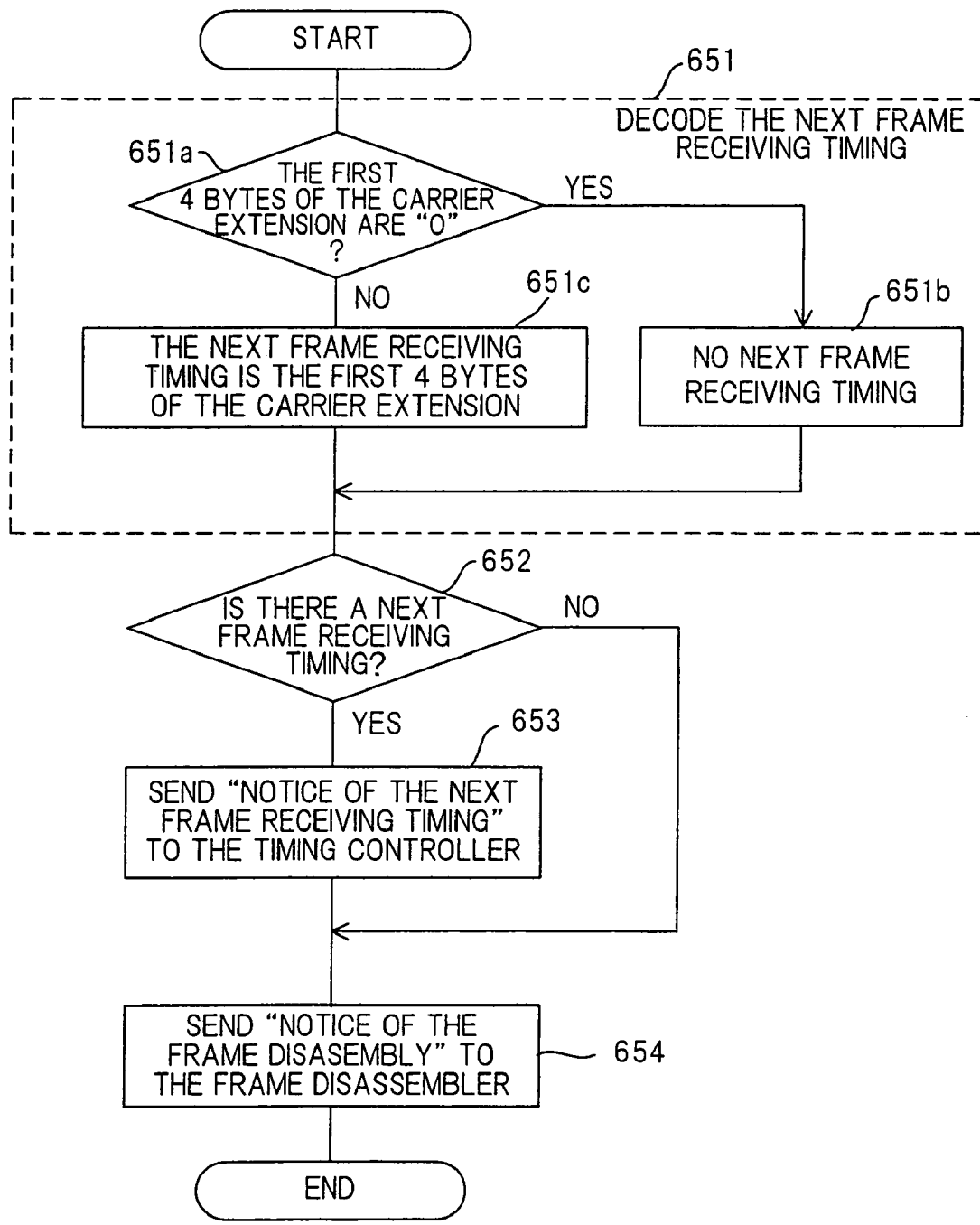
FIG. 28 is a flowchart of a process of extracting a timing of receiving a frame.

(c-2) In the Case in which a Next Frame Transmitting Timing is Added to the Head of the Carrier Extension In the above-described receiving timing extracting process, the next frame transmitting timing information NET is added to the front portion of the preamble PA. When the next frame transmitting timing information NFT is added to the first 4 bytes of the carrier extension (see FIG. 6B), the timing is extracted in accordance with the processing shown in FIG. 28.

When the receiving timing extractor 18 is notified of the reception of a frame from the hard access managing portion 16, it checks whether the first 4 bytes of the carrier extension of the received frame is zero or not (651*a*), and if it is zero, the receiving timing extractor 18 judges that a next frame transmitting timing is not added (step 651*b*).

If the first 4 bytes of the received frame is not zero, the receiving timing extractor 18 recognizes that the value indicated by the first 4 bytes is a next frame transmitting timing (step 651*c*). Then, whether the next frame transmitting timing is added or not is checked (step 652), and if it is added, the receiving timing extractor 18 reports the next frame transmitting timing to the timing controller 14 (step 653). The timing controller 14 records 'frame transmission by other terminal' in the address of the timing reservation management tables corresponding to the notified timing.

When the above processing is ended, the receiving timing extractor 18 sends a request for disassembly of the frame to the frame disassembler 17. The frame disassembler 17, which has received the request for disassembly of the frame, disassembles the frame, and after confirming that the destination address is its own terminal, it transmits the packet portion to the upper layer.

Additionally, when the LAN is a Giga bit Ethernet, the quantized timing of the quantized timing counter (timer) 14*a* is set at 1 $\mu$sec in harmony with the speed of the Giga bit Ethernet. This is because it takes about 5 $\mu$sec to transmit the minimum frame 512 bytes of the Giga bit Ethernet. Accordingly, in the case of a Giga bit Ethernet, if it is assumed that a packet of 64 bytes (frame size is 512 bytes, wherein the carrier extension is 448 bytes) is transmitted at an interval of 20 msec, the timing controller 14 records 'frame transmission by its own terminal' at the address (A+ΔA) (ΔA=20000 (=20 msec/1 $\mu$sec)), and the subsequent 5 addresses of the reservation management table 15 for the purpose of reservation. The transmitting timing adder 13 uses the first 4 bytes of the carrier extension as the next frame transmitting timing, and synthesizes the next frame transmitting timing ΔA=20000 with that portion. The receiving timing extractor 18 on the reception side extracts the next frame transmitting timing ΔA=20000 from the 4 bytes of the carrier extension, and the timing controller 14 records 'frame transmission by other terminal' at the address (A+ΔA) and the subsequent 5 addresses of the reservation management table 15 for the purpose of reservation.

(d) Processing of Receiving the Transmission speed

Figure 29:
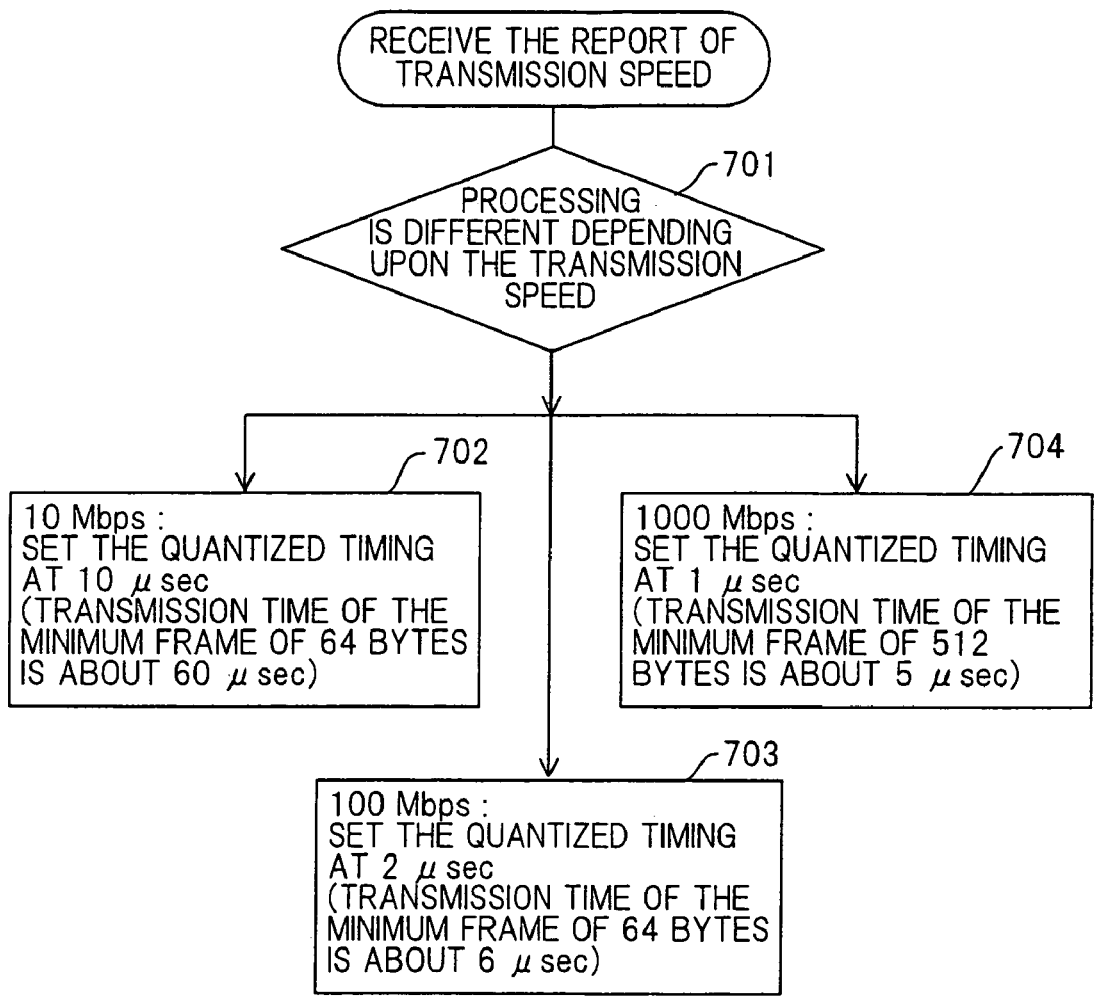
FIG. 29 is a flowchart of a process of receiving a transmission speed.
Figure 30:
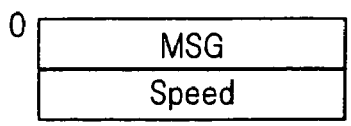
FIG. 30 shows the format for notifying a transmission speed.

FIG. 29 is a flowchart of a process for automatically changing the quantized timing (time interval between adjacent addresses) of the reservation table 15 in accordance with the type of Ethernet. It is impossible to reserve a frame transmitting timing with efficiency unless the quantized timing is reduced in proportion to the frame transmission speed on the transmission line. For this reason, the hard access management portion 16 provides a mechanism for detecting the transmission speed of the LAN by using the existent technique. This transmission speed detector automatically detects the transmission speed in the LAN when the power is on, and reports the detected transmission speed to the timing controller 14 in the message format shown in FIG. 30. The timing controller 14 judges the transmission speed (step 701), and determines the quantized timing on the basis of the reported transmission speed (steps 702 to 704). For example, when the transmission speed is 10 Mbps, since it takes 51.2 μsec to transmit the minimum frame of 64 bytes, the quantized timing is set at 10 μsec (step 702). When the transmission speed is 100 Mbps, since it takes 5.12 μsec to transmit the minimum frame of 64 bytes, the quantized timing is set at 2 μsec (step 703). In the case of a Giga bit Ethernet of 1000 Mbps, since it takes 4.096 μsec to transmit the minimum frame of 512 bytes, the quantized timing is set at 1 μsec (step 704).

In this manner, it is possible to automatically change the quantized timing in accordance with the type of Ethernet.

(e) Processing Executed when the Packet Size is Larger than a Prescribed One

The size of a received packet is sometimes larger than the maximum size prescribed by a LAN. For example, when a large number of real-time pictures are transmitted at one time in a LAN of 10 Mbps (the prescribed maximum size is 1518 bytes), a preferential packet of 3000 bytes is sometimes received from the upper layer. In such a case, it is necessary to divide the packet into a former packet and a latter packet and to add the timing of transmitting the latter packet to the former packet.

Figure 31:
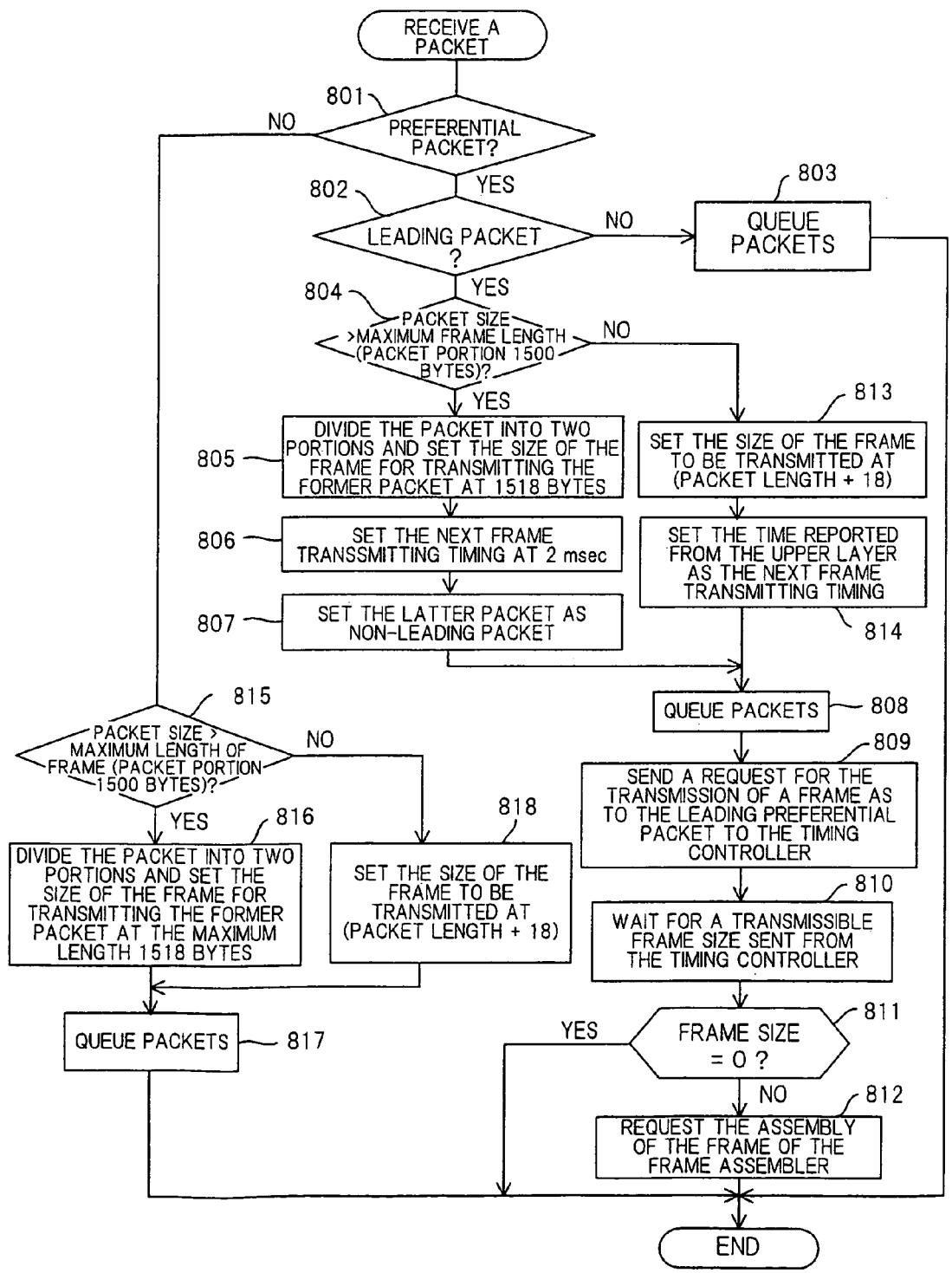
FIG. 31 is a flowchart of a process of receiving a frame when the packet size is larger than the maximum size in a LAN.
Figure 32:
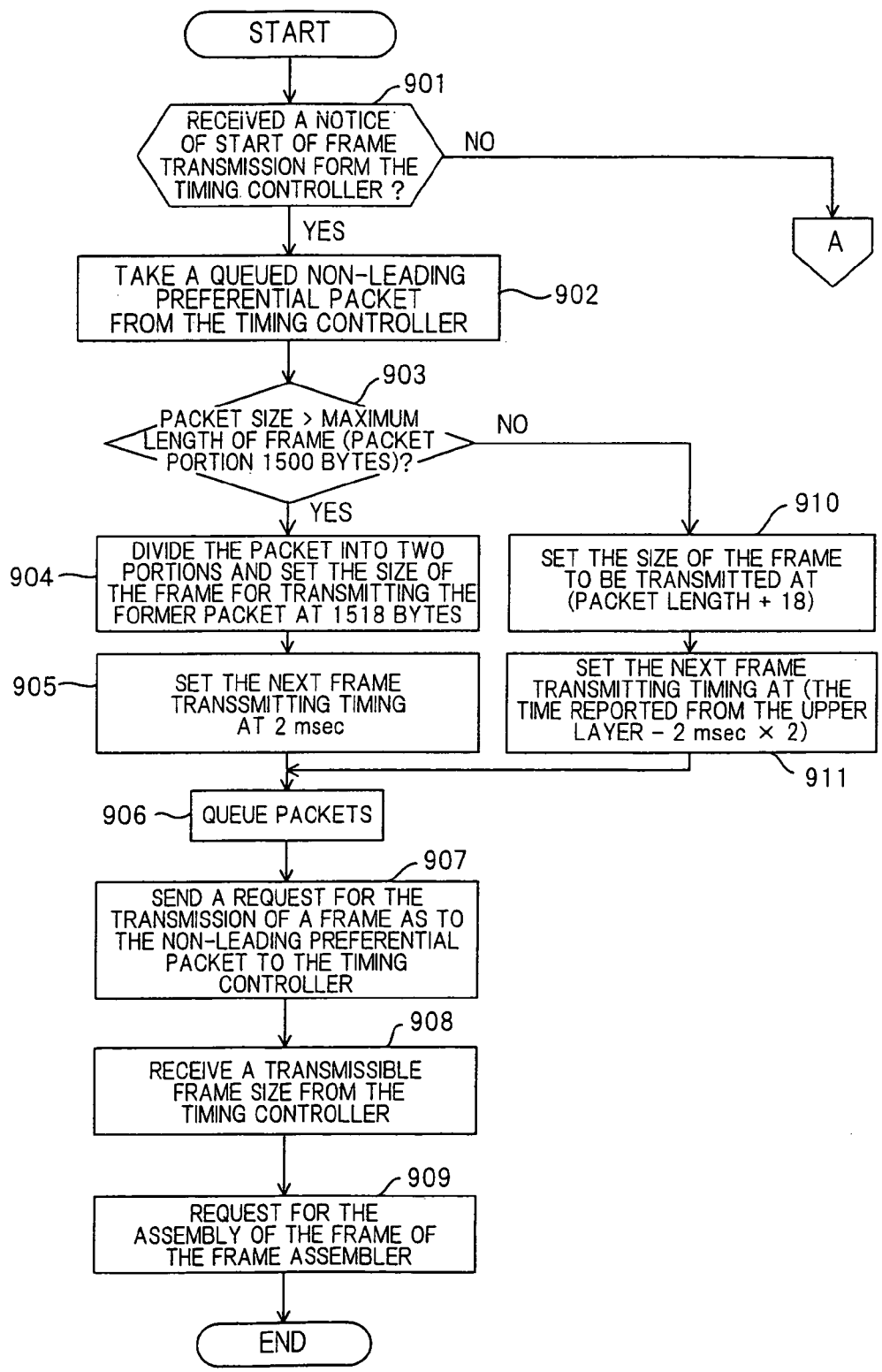
FIG. 32 is a first flowchart of a process carried out when a notice of the start of transmission of a frame is received when the packet size is larger than the maximum size in a LAN.
Figure 33:
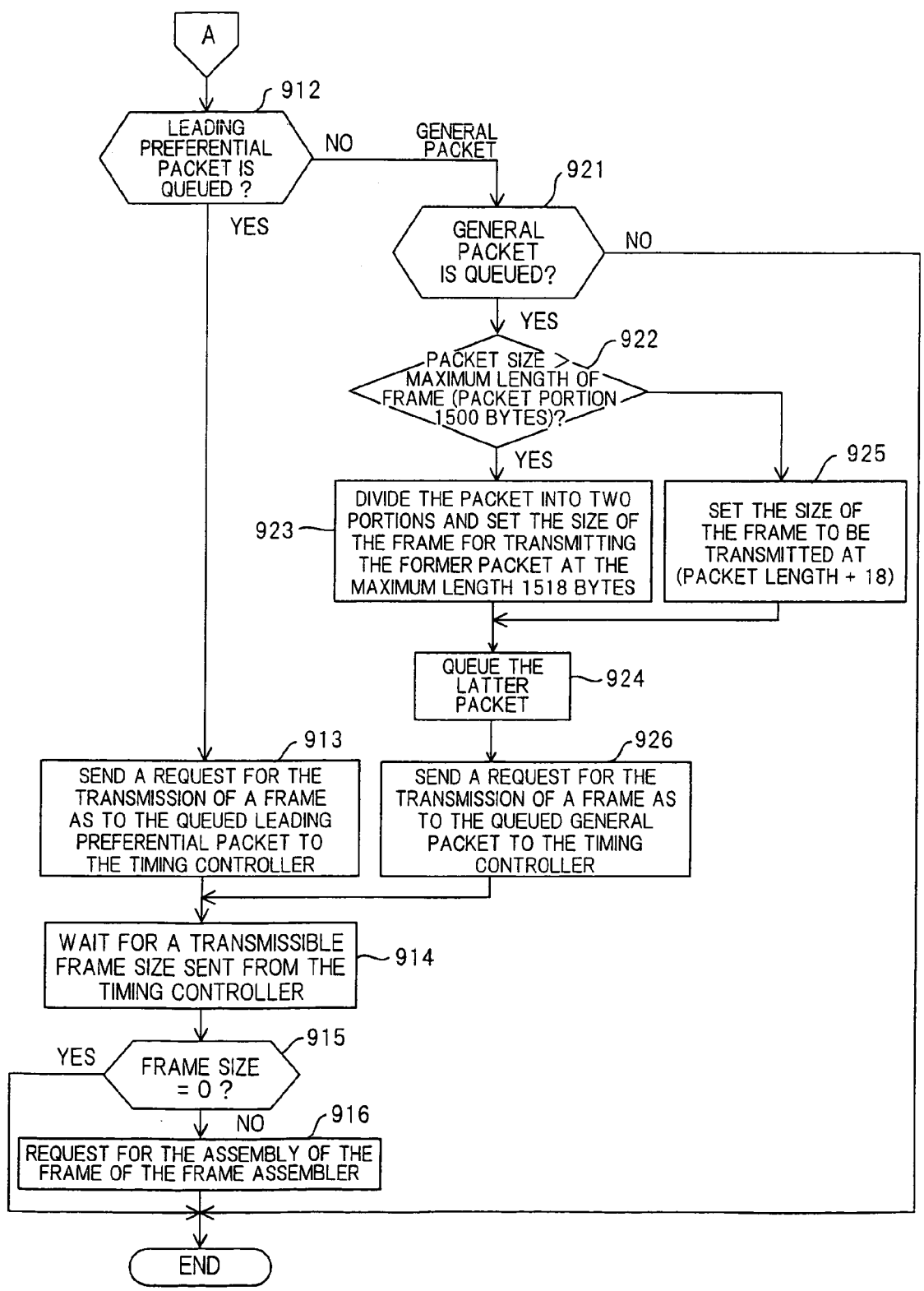
FIG. 33 is a second flowchart of a process carried out when a notice of the start of transmission of a frame is received when the packet size is larger than the maximum size in a LAN.
Figure 34:
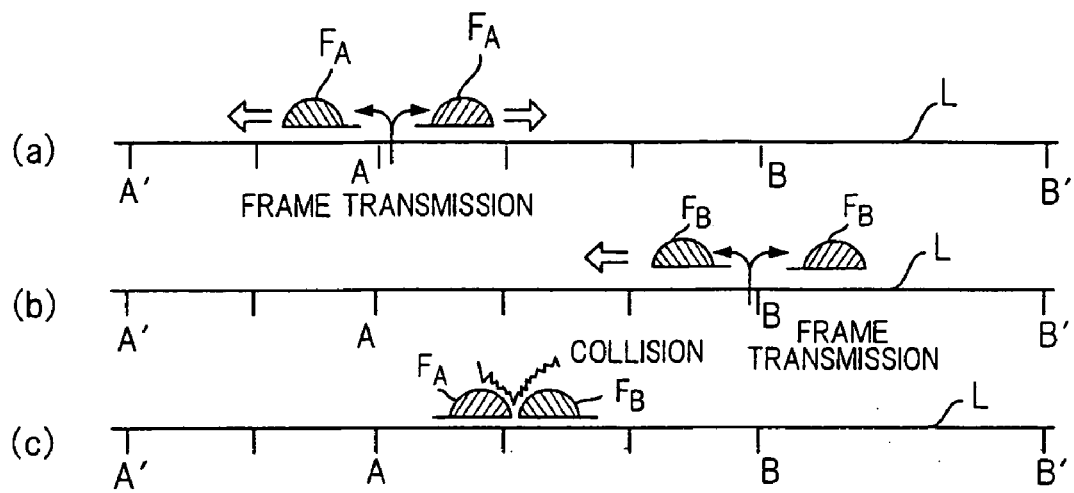
FIG. 34 is an explanatory view of the principle of the CSMA/CD system.
Figure 35:
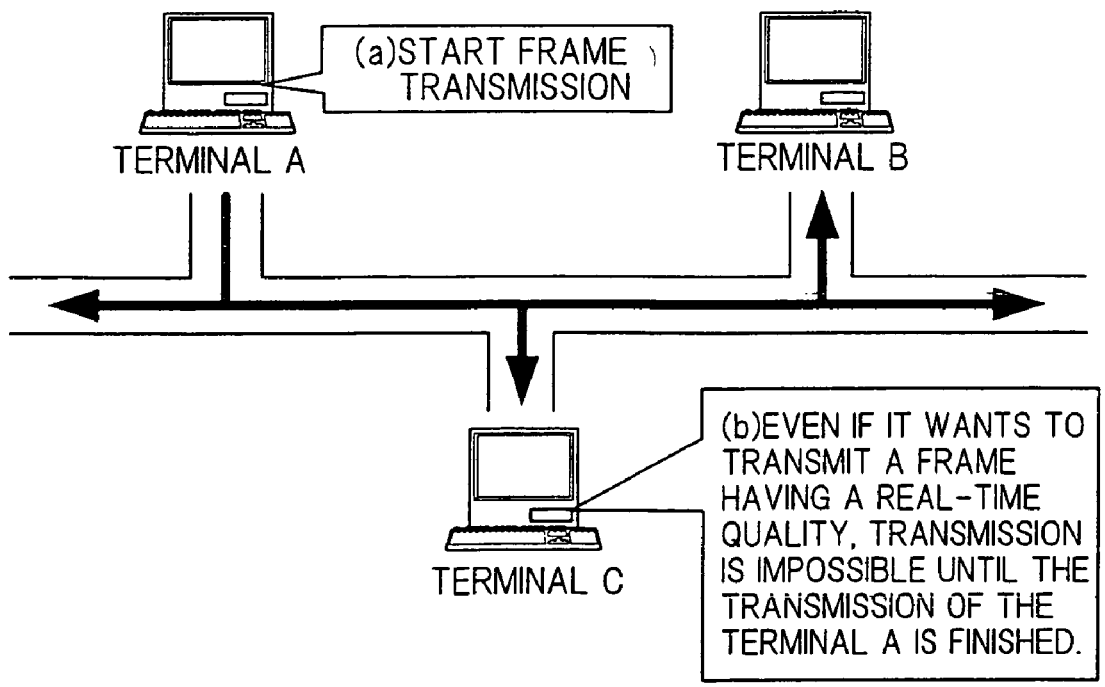
FIG. 35 is an explanatory view of the problems in the CSMA/CD system.
Figure 36:
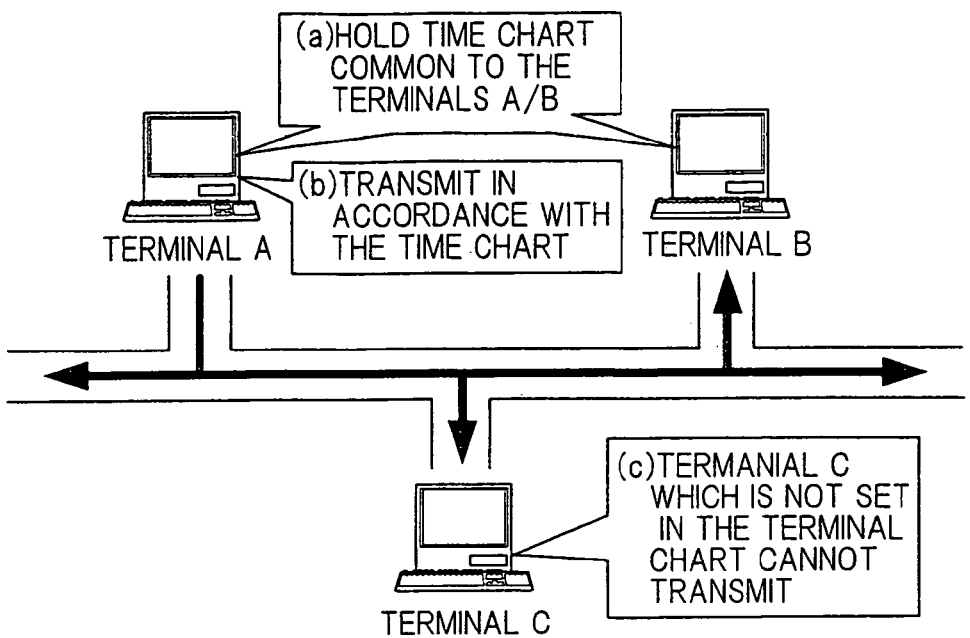
FIG. 36 is an explanatory view of a conventional LAN communication system.
Figure 37:
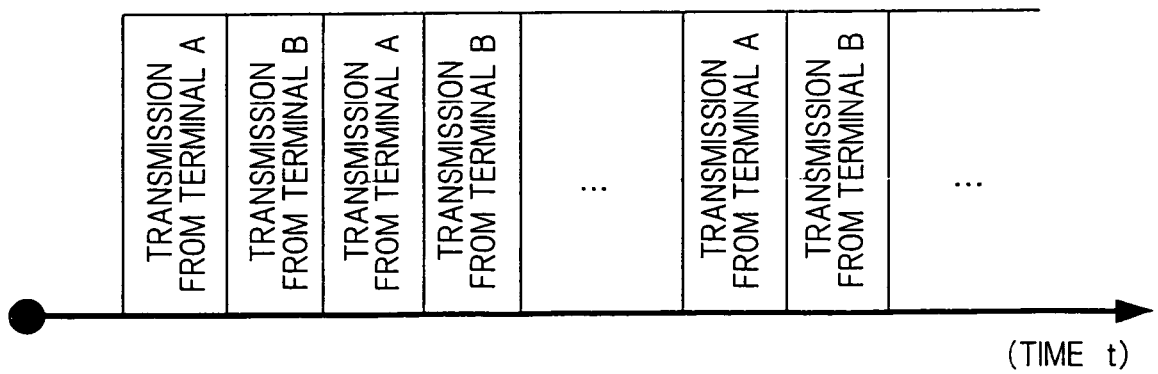
FIG. 37 shows a timing of reservation of a frame.

FIG. 31 is a flowchart of a process for receiving a frame when the size of the packet is larger than the one prescribed by a LAN, and FIGS. 32 and 33 are flowcharts of a process for transmitting a packet having a larger size than the maximum one prescribed by a LAN.

Process for Receiving a Packet Having a Larger Size than the Prescribed One

When the buffer controller 11 receives a packet from the upper layer, it checks whether the packet is a preferential packet or not (step 801), and if it is a preferential packet, whether it is a leading packet or not is then checked (step 802). If the packet is not a leading packet, it is queued in the buffer and no other processing is executed. That is, a non-leading packet is only queued (step 803), and a request for the transmission of the packet is sent on the basis of the flow shown in FIGS. 32 and 33.

On the other hand, if it is a leading preferential packet at the step 802, whether the packet size is larger than the prescribed maximum size or not is checked (step 804). In the LAN of 10 Mbps, the prescribed maximum size of a frame to be transmitted is 1518 bytes (fixed portion: 18 bytes, flexible packet length portion: 1500 bytes), and the time required for transmitting the prescribed maximum size is 2 msec (strictly, the transmission of 1518 bytes takes 1.16 msec).

If the packet size is larger than the prescribed maximum size 1500 bytes, the packet is divided into two portions, and the size of the former frame to be transmitted is set at the prescribed maximum size 1518 bytes (step 805), the timing of transmitting the next frame is set at 2 msec (step 806), and the latter packet is set as a non-leading packet (step 807).

The former and latter packets are then queued (step 808), and a request for transmitting a frame as to the leading (former) preferential packet is sent to the timing controller 14 (step 809). Thereafter, the buffer controller 11 waits for a transmissible frame size output from the timing controller 14 (810). If the buffer controller 11 receives the transmissible size, it checks whether the frame size is zero or not (step 811), and if it is zero, the processing is finished. On the other hand, if it is not zero, the buffer controller 11 sends a request for the assembly of the frame to the frame assembler 12 (step 812), thereby ending the process.

If the packet size is smaller than the prescribed maximum size 1500 bytes at the step 804, the size of the frame to be transmitted is set at (the packet length+18) (step 813), and the time reported from the upper layer is set as the next frame transmitting timing (step 814). The packet is then queued in the buffer, and the processing at the step 809 and thereafter is executed.

If the received packet is a general packet at the step 801, whether the packet size is larger than the prescribed maximum size or not is checked (step 815). If the packet size is larger than the prescribed maximum size 1500 bytes, the packet is divided into two portions, and the size of the frame for transmitting the former packet is set at the prescribed maximum size 1518 bytes (step 816), and the former and latter packets are queued in the buffer (step 817), thereby ending the processing. If the packet size is smaller than the prescribed maximum size 1500 bytes at the step 815, the size of the frame to be transmitted is set at (the packet length+18) (step 818), and the packet is queued in the buffer (step 817), thereby ending the processing.

Process for Transmitting a Packet Larger than the Prescribed Size at the Reserved Time When the size of the frame transmitted at the reserved time is larger than the prescribed size, the processes shown in FIGS. 32 and 33 are executed.

The buffer controller 11 checks whether it has received the 'notice of the start of frame transmission' from the timing controller 14 or not (step 901), and if it has received, it extracts the non-leading preferential packet which is queued in the buffer (step 902).

The buffer controller then checks whether the packet size is larger than the prescribed maximum size (step 903). If the packet size is larger than the prescribed maximum size 1500 bytes, the packet is divided into two portions, and the size of the frame for transmitting the former packet is set at 1518 bytes (step 904), and the next frame transmitting timing is set at 2 msec (step 905).

Thereafter, the buffer controller 11 queues the former and latter packets (step 906) and sends a request for the transmission of a frame as to the former preferential packet to the timing controller 14 (step 907). The buffer controller 111 then waits for a transmissible frame size sent from the timing controller 14 (step 908). When it receives the transmissible frame size, since the frame size is not zero, the buffer controller 11 sends a request for the assembly of the frame to the frame assembler 12 (step 909), thereby ending the process. It is because the non-leading preferential frame is transmitted on the basis of the reserved transmitting timing, which prevents the frame from colliding with a frame from other terminal, that the transmissible frame size is not zero.

If the packet size is smaller than the prescribed maximum size 1500 bytes at the step 903, the transmissible frame size is set at (the packet length+18) (step 910). In addition, if it is assumed that the next frame transmitting timing notified from the upper layer is T, and that the number of times the frame is divided is n, the buffer controller 11 sets the next frame transmitting timing at (T-2 msec×2) (step 911), and executes the processing at the step 906 and thereafter.

On the other hand, if the buffer controller 11 has not received the notice of start of frame transmission at the step 901, it checks whether the leading preferential packet is queued or not (step 912). If the leading preferential packet is queued without being transmitted due to the detection of a carrier or the like, the buffer controller 11 sends a request for the transmission of a frame as to the leading preferential packet (step 913), and waits for a transmissible frame size sent from the timing controller 14 step 914). When it receives a frame transmissible size, whether the frame size is zero or not is checked (step 915). If it is zero, the process is ended, while if it is not zero, a request for the assembly of the frame is sent to the frame assembler 12 (step 916), thereby ending the process.

If the leading preferential packet is not queued at the step 912, whether a general packet is queued or not is checked (step 921), and if the answer is in the negative, the process is ended. If a general packet is queued, however, whether the packet size is larger than the prescribed maximum size or not is checked (step 922). If the packet size is larger than the prescribed maximum size 1500 bytes, the packet is divided into two portions, and the size of a frame for transmitting the former packet is set at the prescribed maximum size 1518 bytes (step 923), and the former and latter packets are queued in the buffer (step 924).

If the packet size is smaller than the prescribed maximum size at the step 922, the size of the frame to be transmitted is set at (the packet length+18) (step 925), and the packet is queued in the buffer.

Thereafter, the buffer controller 11 sends a request for the transmission of a frame as to the general packet to the timing controller 14 (step 926), and waits for a transmissible frame size sent from the timing controller 14 (step 914). When it receives a frame transmissible size, whether the frame size is zero or not is checked (step 915). If it is zero, the process is ended, while if it is not zero, the assembly of the frame is requested of the frame assembler 12 (step 916), thereby ending the process.

As described above, according to the present invention, each LAN interface apparatus is capable of knowing the transmitting time information on the frames of other terminals in the same segment in advance by adding next frame transmitting timing information at the time of sending a frame of which the real-time nature is required. It is therefore possible to send a frame at a timing which avoids a collision with a frame transmitted from another terminal.

According to the present invention, when a frame to which next frame transmitting timing information is added is received, the next frame transmitting timing is reserved, and during the next frame transmitting timing, frame transmission from its own terminal is prohibited. Therefore, the transmission of a frame from the terminal which has reserved the next frame transmitting timing becomes ensured, so that the guarantee of the QoS of the frame which requires the real-time nature such as sound in a LAN is enabled.

In addition, according to the present invention, the reservation of a next frame transmitting timing by all the LAN apparatuses in the same segment is enabled without exerting an influence on the existent Ethernet by incorporating next frame transmitting timing information into a preamble.

According to the present invention, in the case of a Giga bit Ethernet, by incorporating next frame transmitting timing information into a carrier extension, the reservation of a next frame transmitting timing is enabled without exerting an influence on the frame, and without reducing the transmission efficiency.

Further, according to the present invention, by providing a means for determining a next frame transmitting timing, it is possible to deal with the transmission of a packet larger than a prescribed size, thereby enabling the guarantee of the QoS not only of a fixed-rate frame but also of a flexible-rate frame such as a moving picture which involves burst transmission and also requires the real-time nature.

According to the present invention, by providing a timing reservation management table for reserving a next frame transmitting timing and a time register for indexing the table with a time index, the reservation of a next frame transmitting timing is enabled.

Moreover, according to the present invention, by automatically changing the unit of quantization of a time register in accordance with the type of Ethernet, it is possible to reserve a next frame transmitting timing of its own terminal and another terminal irrespective of the type of Ethernet, thereby enabling the guarantee of the QoS.

Furthermore, according to the present invention, since it is possible to realize the guarantee of the QoS of a frame of which the real-time nature is required between LAN interfaces, it is expected telephone communication, transmission of a moving picture, etc. are executed on the LAN without delay by using a personal computer PC. A preparatory negotiation which is necessary in the prior art is dispensed with, and the problem that it is impossible to add a terminal after the conclusion of the negotiation in the prior art is also solved.

As many apparently widely different embodiments of the present invention can be made without departing from the spirit and scope thereof, it is to be understood that the invention is not limited to the specific embodiments thereof except as defined in the depended claims.

What is claimed is:

1. A method of controlling the transmission and reception of a frame in a LAN system comprising the steps of:
adding timing information as to a timing of transmitting a next frame from each terminal to a current frame when said current frame is transmitted from said each terminal onto a shared transmission line;
providing a timing reservation management table and a timer which measures time at certain interval of time and outputs as an address of said table in each terminal;
extracting said timing information from said current frame which is transmitted onto said shared transmission line from another terminal;
reserving both the timing (A) of receiving said next frame from said other terminal and the timing (B) of transmitting a next frame from its own terminal by recording 'frame transmission by other terminal' and 'frame transmission by its own terminal' respectively in addresses of said timing reservation management table, a number of addresses being determined based upon said timing (A) and timing (B); and
transmitting the next frame onto said shared transmission line when said timing (B) of transmitting said next frame from its own comes by reference to said timing reservation management table.

2. A method of controlling the the transmission and reception of a frame according to claim 1, wherein all other terminals reserve the next frame transmitting timing information.

3. A method of controlling the transmission and reception of a frame according to claim 1, wherein said timing information for the next frame is disposed at the front portion of a preamble which is added to said frame and transmitted onto the shared transmission line.

4. A method of controlling the transmission and reception of a frame according to claim 1, wherein when data short of a prescribed size is transmitted with a carrier extension added thereto to satisfy said prescribed size, said timing information for the next frame is inserted into said carrier extension.

5. A method of controlling the transmission and reception of a frame according to claim 1, further comprising the steps of:
dividing data into a former data having a prescribed size and a latter data when the size of said data is larger than said prescribed size;
determining said timing information for a latter frame containing said latter said latter data on the basis of the time required for transmitting a former frame containing said former data; and
regarding said latter frame as a next frame and adding said timing information for said latter frame to said former frame.

6. A method of controlling the transmission and reception of a frame according to claim 1, further comprising the step of:
wherein said timer increments at certain intervals of time in each terminal;
recording one selected from the group consisting of 'frame transmission by other terminal', 'frame transmission by its own terminal' and 'vacant' at a storage portion of said timing reservation management table which is indexed by said address.

7. A method of controlling the transmission and reception of a frame according to claim 6, further comprising the step of changing the unit of said increment of said timer in accordance with the type of said network.

8. A LAN interface apparatus in a LAN system, comprising:
a transmitting timing information adding portion for adding timing information as to the timing of transmitting a next frame to a current frame whereby said current frame is transmitted onto a shared transmission line;
a timing extractor for extracting said timing information from a frame which is transmitted onto said shared transmission line from another terminal,
a timing reservation management table for reserving a timing (B) of transmitting a next frame from its own terminal and a timing (A) of receiving a next frame from said other terminal;
a timer which measures time at certain interval of time and outputs the time as an address of said table;
a table management portion for recording 'frame transmission by other terminal' and 'frame transmission by its one terminal' respectively in an address of said timing reservation management table, a number of addresses being determined based upon said timing (A) and timing (B); and
a timing controller for prohibiting a frame from being transmitted from its own terminal at said timing (A) of receiving a frame from said other terminal, while allowing a frame to be transmitted from its own terminal onto said shared transmission line when said timing (B) of transmitting a next frame comes by reference to said timing reservation management table.

9. A LAN interface apparatus according to claim 8, further comprising:
a buffer controller for queuing packets to be transmitted and outputting a predetermined packet when the transmission of said packet is instructed by said timing controller; and
a frame assembler for assembling said packet into a frame;
wherein said transmitting timing information adding portion adds said timing information for the next frame to said frame which is output from said frame assembler.

10. A LAN interface apparatus according to claim 9, wherein said buffer controller divides a packet to be transmitted into a former packet having a prescribed size and a latter packet when the size of said packet is larger than said prescribed size, and queues said former and later packets, and said transmitting timing information adding portion determines said timing information for a latter frame which is assembled by using said latter packet, on the basis of the time required for transmitting a former frame which is assembled by using said former packet, and regards the latter frame as a next frame and adds the determined timing information to the former frame.

11. A LAN interface apparatus according to claim 8, further comprising:
said timer increments at certain intervals of time; and
said table management portion recording one selected from the group consisting of 'frame transmission by other terminal', 'frame transmission by its own terminal' and 'vacant' at the storage portion of said timing reservation management table which is indexed by said address.

12. A LAN interface apparatus according to claim 11, further comprising:
a means for detecting the transmission speed of said transmission line; and
a means for determining the unit of increment of said timer on the basis of said transmission speed.

* * * * *